United States Patent
van den Dungen et al.

(10) Patent No.: US 12,452,233 B2
(45) Date of Patent: Oct. 21, 2025

(54) MULTI-REGION LOGIN

(71) Applicant: Oracle International Corporation, Redwood Shores, CA (US)

(72) Inventors: Martinus Petrus Lambertus van den Dungen, Snohomish, WA (US); Gregg Alan Wilson, Austin, TX (US); Girish Nagaraja, Sammamish, WA (US); Ghazanfar Ahmed, Redmond, WA (US); Taoran Li, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 185 days.

(21) Appl. No.: 18/050,453

(22) Filed: Oct. 27, 2022

(65) Prior Publication Data
US 2023/0137359 A1     May 4, 2023

Related U.S. Application Data

(60) Provisional application No. 63/273,806, filed on Oct. 29, 2021.

(51) Int. Cl.
   *H04L 9/40* (2022.01)
(52) U.S. Cl.
   CPC ........ *H04L 63/0838* (2013.01); *H04L 63/102* (2013.01); *H04L 63/107* (2013.01)
(58) Field of Classification Search
   CPC ..... H04L 63/0838; H04L 63/107; H04W 4/02
   See application file for complete search history.

(56) References Cited

U.S. PATENT DOCUMENTS

| | | |
|---|---|---|
| 9,177,125 B2 | 11/2015 | Steeves et al. |
| 9,781,122 B1 | 10/2017 | Wilson et al. |
| 9,838,376 B1 | 12/2017 | Lander et al. |
| 10,255,061 B2 | 4/2019 | Lander et al. |
| 10,341,410 B2 | 7/2019 | Lander et al. |
| 10,425,386 B2 | 9/2019 | Wardell et al. |
| 10,454,940 B2 | 10/2019 | Lander et al. |
| 10,484,243 B2 | 11/2019 | Cole et al. |
| 10,484,382 B2 | 11/2019 | Wilson et al. |
| 10,511,589 B2 | 12/2019 | Gangawane et al. |
| 10,594,684 B2 | 3/2020 | Bansal et al. |
| 10,616,224 B2 | 4/2020 | Subramanian et al. |
| 10,715,564 B2 | 7/2020 | Mohamad Abdul et al. |
| 10,798,165 B2 | 10/2020 | Srinivasan et al. |
| 10,846,390 B2 | 11/2020 | Subramanian et al. |
| 10,878,079 B2 | 12/2020 | Vepa et al. |
| 10,931,656 B2 | 2/2021 | Carru et al. |

(Continued)

OTHER PUBLICATIONS

Dynamic User Routing, Available Online at: https://github.com/curityio/dynamic-user-routing, Accessed from internet on Nov. 24, 2021, 3 pages.

(Continued)

*Primary Examiner* — Esther B. Henderson
(74) *Attorney, Agent, or Firm* — Kilpatrick Townsend & Stockton LLP

(57) ABSTRACT

A system for providing login to a network of a cloud service provider via more than one region is described herein. For example, the system and approaches may store authentication information in multiple regions allowing for authentication in the multiple regions.

20 Claims, 12 Drawing Sheets

(56) References Cited

U.S. PATENT DOCUMENTS

| | | | |
|---|---|---|---|
| 11,061,929 | B2 | 7/2021 | Xu et al. |
| 11,165,634 | B2 | 11/2021 | Medam et al. |
| 11,308,132 | B2 | 4/2022 | Srinivasan et al. |
| 11,321,343 | B2 | 5/2022 | Srinivasan et al. |
| 2019/0306138 | A1* | 10/2019 | Carru .................... H04L 63/10 |
| 2019/0306237 | A1* | 10/2019 | Srinivasan .......... H04L 67/1095 |
| 2019/0312857 | A1* | 10/2019 | Lander .................. H04L 9/3271 |
| 2020/0250664 | A1 | 8/2020 | Kumar et al. |
| 2020/0264860 | A1 | 8/2020 | Srinivasan et al. |
| 2021/0081252 | A1 | 3/2021 | Bhargava et al. |
| 2021/0084031 | A1 | 3/2021 | Lao et al. |
| 2023/0090035 | A1* | 3/2023 | Lea ....................... H04W 76/15 370/329 |
| 2023/0106025 | A1* | 4/2023 | Genchev ................ H04L 47/82 726/4 |

OTHER PUBLICATIONS

How Does Azure Cosmos DB Provide High Availability, Available Online at: https://docs.microsoft.com/en-us/azure/cosmos-db/high-availability#slas-for-availability, Nov. 11, 2021, 12 pages.

How To Auto Region Select User? Available Online at: https://community.auth0.com/t/how-to-auto-region-select-user/9776, Mar. 6, 2018, 2 pages.

Introducing Multi-Region User Pools, Available Online at: https://web.archive.org/web/20210310232816/https://aws.amazon.com/about-aws/whats-new/2020/04/introducing-multi-region-user-pools/#close, Apr. 23, 2020, 3 pages.

Multi-Region Deployment, Available Online at: https://curity.io/resources/learn/multi-region-deployment/, Accessed from internet on Nov. 30, 2021, 9 pages.

Sync Cognito Users Across Region, Available Online at: https://forums.aws.amazon.com/thread.jspa?threadID=251879&tstart=125, Accessed from internet on Nov. 24, 2021, 5 pages.

Trend Micro Cloud One Regions, Available Online at: https://cloudone.trendmicro.com/docs/account-and-user-management/c1-regions/, Accessed from internet on Nov. 24, 2021, 3 pages.

Understanding Regions, Available Online at: https://help.skytap.com/understanding-regions.html, Accessed from internet on Nov. 24, 2021, 4 pages.

Balkan, Serving Users from Multiple Regions with Cloud Run, Available Online at: https://ahmet.im/blog/cloud-run-multi-region/, Jul. 20, 2020, 5 pages.

Nallathamby, Multi-Region Deployment for WSO2 Identity Server—Part 2, Available Online at: https://wso2.com/library/articles/2018/04/multi-region-deployment-for-wso2-identity-server-part-2/, May 1, 2018, 7 pages.

International Application No. PCT/US2022/078936, International Search Report and Written Opinion mailed on Feb. 22, 2023, 13 pages.

Yamasaki et al., Disposition of Comments on SC 27 N12294 Summary of National Body Comments Received on SC 27 N11916—ISO/IEC 4th WD 27017—Code of Practice for Information Security Controls for Cloud Computing Services based on ISO/IEC 27002, Information Technology—Security techniques, vol. 8/17, Jul. 2013, pp. 1-197.

* cited by examiner

MULTI-REGION LOGIN

CROSS-REFERENCE TO RELATED APPLICATIONS

This application claims priority to U.S. provisional application No. 63/273,806 entitled "MULTI-REGION LOGIN", filed on Oct. 29, 2021, the disclosure of which is incorporated by reference herein in its entirety for all purposes.

BACKGROUND

A cloud service provider (CSP) provides a variety of services to customers on demand using one or more networks. The CSP often requires the customers to sign in to access the networks to gain the services. The customers provide login credentials to the CSP to be utilized to determine whether the customers are to be provided access to networks.

In many instances, the login credentials include a single-use password, such as a time-based one-time password (TOTP). If the customer attempts to login to the networks a second time with a previously used single-use password, the CSP can deny access to the networks for security reasons. Further, the CSP can maintain a number of failed login attempts and select to prevent login to an account associated with the failed login attempts. To achieve these security protections, an entity being utilized for login would need to be able to determine the single-use passwords previously utilized for logging in and the number of failed login attempts. Legacy CSP addressed this by storing the previously utilized single-use passwords and the number of failed login attempts in a single entity and directing all login attempts of customers to that particular entity.

SUMMARY

The present disclosure relates generally to a framework for multi-region login to a network of a cloud service provider. Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the detailed description section, and further description is provided therein.

An aspect of the present disclosure is directed to a method for facilitating multi-region login, including receiving a request to log in to a network of a cloud service provider (CSP) and identifying login credentials received in the request. The method may further include retrieving, from two or more regions of the cloud service provider, authentication information related to the request, and determining, based at least in part on the login credentials and the authentication information, whether to provide access to the network. Further, the method may include providing access to the network in accordance with a determination to provide access to the network, or denying access to the network in accordance with a determination not to provide access to the network.

An aspect of the present disclosure is directed to one or more computer-readable media having instructions stored thereon, wherein the instructions, when executed by one or more processors, cause the one or more processors to perform operations including receiving a request to log in to a network of a cloud service provider (CSP) and identifying login credentials received in the request. The operations may further include retrieving, from two or more regions of the cloud service provider, authentication information related to the request, and determining, based at least in part on the login credentials and the authentication information, whether to provide access to the network. Further, the operations may include providing access to the network in accordance with a determination to provide access to the network, or denying access to the network in accordance with a determination not to provide access to the network.

An aspect of the present disclosure is directed to a server device, may include memory to store login credentials received in a request, and one or more processors coupled to the memory. The one or more processors may receive the request to log in to a network of a cloud service provider (CSP), and identify the login credentials received in the request. The one or more processors may further store the login credentials in the memory, retrieve, from two or more regions of the cloud service provider, authentication information related to the request, and determine, based at least in part on the login credentials and the authentication information, whether to provide access to the network. Further, the one or more processors may provide access to the network in accordance with a determination to provide access to the network, or deny access to the network in accordance with a determination not to provide access to the network.

An aspect of the present disclosure is directed to a method, including receiving, by a computing device, a request to log in to a network of a cloud service provider (CSP), and identifying, by the computing device, login credentials received in the request, the login credentials including a passcode. The method may further include querying, by the computing device, a first data center of the cloud service provider located in a first region for first authentication information related to the request, the first authentication information including a first set of passcodes utilized for login to the network in accordance with the first region being available, and querying, by the computing device, a second data center of the cloud service provider located in a second region for second authentication information related to the request, the second authentication information including a second set of passcodes utilized for login to the network or replicated from the first set of passcodes in accordance with the second region being available. The method may further include determining, by the computing device based at least in part on one or more responses received in response to the querying of the first data center or the querying of the second data center, whether the passcode had been previously utilized, determining, by the computing device, whether to provide access to the network based at least in part on whether the passcode had been previously utilized, and providing, by the computing device, access to the network in accordance with a determination to provide access to the network.

An aspect of the present disclosure is directed to one or more non-transitory computer-readable media having instructions stored thereon, wherein the instructions, when executed by one or more processors, cause the one or more processors to perform operations including receiving a request to log in to a network of a cloud service provider (CSP) and identifying login credentials received in the request, the login credentials including a passcode. The operations may further include querying a first data center of the cloud service provider located in a first region for first authentication information related to the request, the first authentication information including a first set of passcodes utilized for login to the network in accordance with the first region being available, and querying a second data center of the cloud service provider located in a second region for second authentication information related to the request, the second authentication information including a second set of passcodes utilized for login to the network or replicated from the first set of passcodes in accordance with the second region being available. The operations may further include determining, based at least in part on one or more responses received in response to the querying of the first data center or the querying of the second data center, whether the passcode had been previously utilized, determining whether to provide access to the network based at least in part on whether the passcode had been previously utilized, and providing access to the network in accordance with a determination to provide access to the network.

An aspect of the present disclosure is directed to a server device, the server device including memory to store login credentials received in a request and one or more processors coupled to the memory, the one or more processors may receive the request to log in to a network of a cloud service provider (CSP), identify the login credentials received in the request, the login credentials including a passcode, and store the login credentials in the memory. The one or more processors may further query a first data center of the cloud service provider located in a first region for first authentication information related to the request, the first authentication information including a first set of passcodes utilized for login to the network in accordance with the first region being available, and query a second data center of the cloud service provider located in a second region for second authentication information related to the request, the second authentication information including a second set of passcodes utilized for login to the network or replicated from the first set of passcodes in accordance with the second region being available. The one or more processors may further determine, based at least in part on one or more responses received in response to the querying of the first data center or the querying of the second data center, whether the passcode had been previously utilized, determine whether to provide access to the network based at least in part on whether the passcode had been previously utilized, and provide access to the network in accordance with a determination to provide access to the network.

The foregoing, together with other features and embodiments will become more apparent upon referring to the following specification, claims, and accompanying drawings.

DETAILED DESCRIPTION

Figure 1:
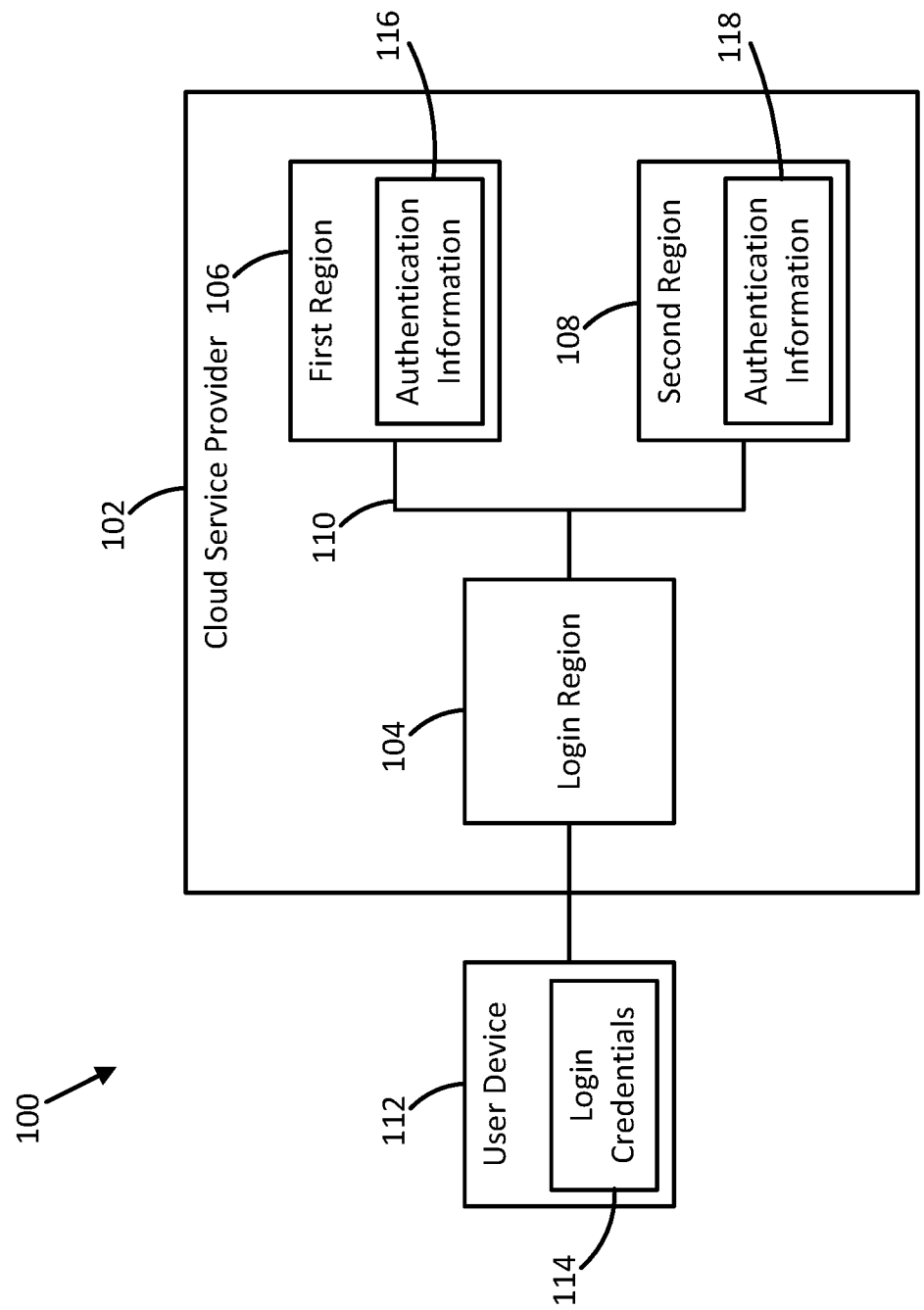
FIG. 1 illustrates an example system arrangement, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A cloud service provider (CSP) may provide multiple cloud services to subscribing customers. These services may be provided under different models including a Software-as-a-Service (SaaS), Platform-as-a-Service (PaaS), an Infrastructure-as-a-Service (IaaS) model, and others. The CSP may provide the multiple cloud services via one or more networks, where each of the networks can comprise a computer and software that can provide the services.

In the cloud environment, an identity management system is generally provided by the CSP to control user access to resources provided or used by a cloud service. Typical services or functions provided by an identity management system include, without restriction, single-sign on capabilities for users, authentication and authorization services, and other identity-based services.

The resources that are protected by an identity management system can be of different types such as compute instances, block storage volumes, virtual cloud networks (VCNs), subnets, route tables, various callable APIs, internal or legacy applications, and the like. These resources include resources stored in the cloud and/or customer on-premise resources. Each resource is typically identified by a unique identifier (e.g., an ID) that is assigned to the resource when the resource is created.

Techniques for allowing a customer and/or a client (which is referred to collectively as a customer throughout the disclosure) to login to replicated regions and/or portions of a CSP are described herein. In particular, a CSP may be organized into one or more regions (e.g., datacenters in particular geographic regions), where each region may be defined by a data center in a different geographic area serviced by the CSP. For example, a first region may correspond to a first data center located in a first geographic area serviced by the CSP and a second region may correspond to a second data center located in a second geographic area service by the CSP, where the second geographic area is different from the first geographic area. Each region may be composed of one or more data centers. Operations can be described as being performed by a region throughout this disclosure, where it should be understood that one or more of the data centers of the region may perform the operations. For example, where a first region is described as performing an operation, it should be understood that one or more services provided by one or more data centers within the first region perform the operation.

In some embodiments, the CSP may provide a subscription service for the regions of the CSP. For example, the CSP may allow customers to subscribe to one or more regions of the CSP. The CSP may allow customers that are subscribed to a region to utilize the services provided by the region and may prevent customers/users that are not subscribed to the region from utilizing the services provided by the region. The CSP may maintain accounts for each of the customers, where an account for a customer may indicate the regions to which the customer is subscribed. The account may further indicate other information related to the customer associated with the account, as described further throughout this disclosure.

The regions to which a customer is subscribed may be assigned different roles for the customer. For example, the regions may be assigned as a home region or a subscribed region. There may be a single home region assigned for a customer. The region assigned as the home region may allow the customer to perform write operations and read operations to data stored by the region. There may be multiple subscribed regions assigned for a subscriber. The regions assigned as the subscribed regions may prevent write operations for at least a portion of data stored by the regions, thereby only allowing read operations to be performed to the portion of the data. The subscribed regions may be assigned ranks, such as a first subscribed region, a second subscribed region, a third subscribed region, and so forth. The operations of the subscribed regions may differ based on the rankings of the subscribed regions. For example, the first subscribed region may store authentication information for the customer that may be utilized for authentication of the customer as described further throughout the disclosure. The roles may be assigned by the customer and/or the CSP. For example, the CSP may assign the roles based on the order which the customer subscribes to the regions in some instances. In some of these instances, the first region to which the customer subscribes may be assigned as the home region, the second region to which the customer subscribes may be assigned as the first subscribed region, and so forth. In some instances, the customer may assign the home region, the subscribed regions, and/or the ranks for the subscribed regions.

One or more domains may be stored in the data centers, where the domains may comprise a container that stores information and that can utilize resources of the data centers. Each of the domains may have an assigned home region for the domain, which may be referred to as a domain home region. Generally, a customer may be directed to a corresponding region (which may be referred to as a tenancy home region) for logging into the CSP. The tenancy home region may be a region where updates to Infrastructure Identity and Access Management (IAM) related information is allowed for the customer. However, one or more regions of a CSP may become unavailable (for example, the region may be down or services within the region may be unreachable) during operation. In legacy approaches, when a tenancy home region corresponding to the customer was unavailable at the time that the customer attempted to login, access to the tenancy home region would be unavailable and the customer would be left in a broken state.

Techniques described herein may include having one or more replicated domains in different regions. For example, an Identity Cloud Services (IDCS) stripe for the tenant may be located within the home region associated with the customer. The IDCS stripe may be replicated in one or more other regions in addition to the home region. The IDCS stripe may be replicated in the regions via synchronized back channel communications. A login selection may provide the customer with one or more domains that are available for login from which the customer can select. A list of available domains may be retrieved from a home region and/or a first replicated region corresponding to the customer. The available domains indicated may be located in regions that are available at the time of login. Based on selection of a domain from the list of available domains, the CSP may direct the customer to the IDCS stripe in the region corresponding to the selected domain for login by the customer. The IDCS stripe utilized for login may read and/or write some data to and/or from one or more other regions during the authentication to coordinate the IDCS stripes between the regions. In some instances, the regions which the data is read from and/or written to may include the domain home region and the first replicated region corresponding to the customer.

In some instances, the customer may be directed to or may select a domain for login within a region that is down. In these instances, the CSP may update information to prevent customers from being directed to or selecting the domain for login until the region is determined to have begun operating properly again. The CSP may additionally provide other available domains that the customer may utilize for login. The customer may then select one of the other available domains for login.

In some instances, the domain home region and/or the first replicated region may be unavailable while the customer logs in in a different region. As the region which the customer logs in is unable to write to the domain home region and/or the first replicated region, the region may coordinate with the domain home region and/or the first replicated region to merge any conflicts between the regions. For example, the region may coordinate with the domain home region and/or the first replicated region to update the stored information related to logins to the most recently updated stored information.

FIG. 1 illustrates an example system arrangement 100, according to at least one embodiment. The system arrangement 100 illustrates an example of a system having an IDCS stripe, or a portion thereof, replicated in multiple regions of a CSP. For example, the system may have replicated authentication information in multiple regions, where the replicated authentication information may be in an IDCS stripe and the authentication information may be utilized for determining whether one or more users are customers that are allowed to access the CSP.

The system arrangement 100 may include a CSP 102. The CSP 102 may comprise a network of computer hardware implementing software that can provide services to the customers. The computer hardware and/or the software of the CSP 102 may be referred to as resources, where a customer may utilize or request the resources to perform operations. The CSP 102 may include an IAM, where the IAM may control access of users to the CSP 102.

The CSP 102 may be organized into one or more regions, where each of the regions form part of a network of the CSP 102. For example, the CSP 102 illustrated includes a login region 104, a first region 106, and a second region 108. Each of the regions may include a portion of the computer hardware of the CSP 102. For example, the login region 104 may include a first portion of the computer hardware of the CSP 102, the first region 106 may include a second portion of the computer hardware of the CSP 102, and the second region 108 may include a third portion of the computer hardware of the CSP 102. In some embodiments, each of the regions may correspond to a particular geographical area, where the computer hardware within a region is located within the corresponding geographical area. The computer hardware in a region may correspond to one or more routers and/or switches that connects the region to one or more other regions. For example, the computer hardware within the login region 104 may correspond to one or more routers and/or switches that connect the login region 104 with one or more routers and/or switches corresponding to the first region 106 and one or more routers and/or switches corresponding to the second region 108 in the illustrated embodiment. The routers and/or switches corresponding to a region may act as an access point to the region, such that electronic communication traffic to and from the region passes through at least one of the routers and/or switches. The corresponding routers and/or switches may further connect the region to one or more other external devices in some embodiments, such as the internet and/or user devices associated with users.

In some embodiments, one or more of the regions of the CSP 102 may be connected with one or more other regions within the CSP 102 by one or more back channels. For example, the login region 104 is connected to the first region 106 and the second region 108 by a back channel 110 in the illustrated embodiment. The back channels may connect to routers and/or switches of the regions, where the routers and/or switches may act as access points to the regions for the back channels. The routers and/or switches to which the back channels are connected may be separate from the routers and/or switches that connect the regions to external devices. The back channels may provide for connections between two or more regions within the CSP 102. For example, the back channels may provide a direct connection between two regions within the CSP 102 or may provide a shared connection between more than two regions within the CSP 102. For example, the back channel 110 in the illustrated embodiment may provide a shared connection between the login region 104, the first region 106, and the second region 108. In some embodiments, the back channel 110 may be inaccessible to elements outside of the CSP 102, such as user devices external to the CSP 102. The back channels may provide for synchronized or unsynchronized messages to be transmitted between the regions that can provide for exchange of data between the regions.

The system arrangement 100 may include one or more user devices that may connect with the CSP 102. For example, the system arrangement 100 includes a user device 112 in the illustrated embodiment. The user devices may be external to the CSP 102 and may connect to the CSP 102 by one or more wired or wireless connections, such as a connection through the internet. For clarity, the description herein refers to the user device 112, however it should be understood that one or more operations performed by the user device 112 and/or performed with respect to the user device 112 may be performed by or with respect to one or more other user devices.

The system arrangement 100 may illustrate elements associated with a login of the user device 112. In particular, the system arrangement 100 may illustrate elements exchanged between the user device 112 and the elements of the CSP 102 that may be utilized for the login of the user device 112 to the CSP 102, such that the user device 112 may utilize the services of the CSP 102.

A user may utilize the user device 112 to request access to the CSP 102. For example, the user may enter an internet protocol (IP) address corresponding to the CSP 102 (or some portion thereof) into a browser of the user device 112, where the CSP 102 (or a portion thereof) may instruct the user device 112 to display a user interface for accessing the CSP 102. The user interface may include input fields for login credentials 114 to be utilized for determining whether the user is authorized to access the CSP 102. In some embodiments, the login credentials 114 may include a passcode. The passcode may be a single-use password in some embodiments. In some embodiments, the CSP 102 may request characteristic information of the user device 112 and/or indications of results of prior login attempts as part of the login credentials 114.

The user device 112 may obtain login credentials 114 for login of a user using the user device 112. For example, the user device 112 may receive login credentials 114 from a user using the user device 112 and/or retrieve information indicating characteristics of the user device 112 (such as an identifier, key, and/or other values associated with the user device 112). The login credentials 114 may include inputs from a user, such as a passcode and/or a single-use password. In some embodiments, the single-use password may be a time-based one-time password (TOTP). The single-use password may be generated by a program related to the CSP 102. In particular, the program may generate a single-use password and may provide the single-use password to the user and to the CSP 102. The program may provide the single-use password to the user via an email account associated with the user, a telephone number associated with the user (such as via text messaging and/or voice messaging), software executing on the user device 112 that can receive the single-use password from the program related to the CSP 102, and/or via other approaches known in the art for providing single-use passwords to a user. During a login process, the CSP 102 may request input of the single-use password from the user of the user device 112, e.g., in a displayed login interface. The user may input the single-use password with other user credentials (such as a password associated with the user) into the user device 112. During the login process, the user device 112 provides the login credentials 114 to the CSP 102 to be utilized by the CSP 102 for determining whether to allow the user to log in to the CSP 102.

In some embodiments, the login credentials 114 received from the user device 112 may further include information related to previous login attempts and/or previous logins initiated by the user device 112. For example, the user device 112 may maintain a count of how many consecutive times that the user of the user device 112 attempted to log in to the CSP 102 and failed. The user device 112 may include an indication of the number of times that the user consecutively failed to log in to the CSP 102 in the login credentials 114. In other embodiments, the CSP 102 may maintain a count of how many consecutively failed login attempts were made by the user device 112 and/or for accessing an account of a particular customer. The CSP 102 may determine whether the number of consecutively failed login attempts has exceeded a threshold number of attempts and may determine that the user is not to be provided access to the CSP 102 based on the number of consecutively failed login attempts exceeding the threshold number of attempts.

In the illustrated embodiment, the user device 112 may be directed to the login region 104 during the login process to the CSP 102. The user device 112 may be directed to the login region 104 based on: the user device 112 being geographically closest to the login region 104 compared to the other regions of the CSP 102; the login region 104 being the geographically closest region of the CSP 102 to the user device 112 that is available; the IP address utilized by the user device 112 as part of the login process corresponding to the login region 104; the user device 112 indicating a selection of the login region 104 to be utilized for the login process; or some combination thereof. As a result of being directed to the login region 104, the user device 112 provides the login credentials 114 to the login region 104 as part of the login process.

The login region 104 may utilize the login credentials 114 provided by the user device 112 to determine whether the user of the user device 112 is to be allowed access to the CSP 102. For example, the login region 104 may use authentication information in combination with the login credentials 114 to determine whether the user is to be allowed access to the CSP 102. Authentication information for determining whether a user is to be allowed to access the CSP 102 may be stored in two or more regions of the CSP 102. However, there may be regions of the CSP 102 that do not have the authentication information corresponding to the user stored, where the user may still be able to login to the CSP 102 in regions that do not have the authentication information corresponding to the user stored.

In some embodiments, authentication information corresponding to a user may be stored in a home region corresponding to the user and a first subscribed region corresponding to the user. In the illustrated embodiment, the first region 106 stores first authentication information 116 corresponding to the user and the second region 108 stores second authentication information 118 corresponding to the user. The first authentication information 116 may be, or may be part of, an IDCS stripe maintained within the first region 106 and the second authentication information 118 may be, or may be part of, the IDCS stripe replicated within the second region 108. In some embodiments, the first region 106 may be a home region for the user and the second region 108 may be a first subscribed region. The user, or an entity associated with the user, may be able to define the home region and/or the first subscribed region corresponding to the user. In the illustrated embodiment, the login region 104 does not store authentication information corresponding to the user.

The authentication information may include information for determining whether the user is authorized to access the CSP 102 and/or information related to previous logins of the user. For example, the authentication information may include one or more passcodes corresponding to the user, an indication of one or more devices which the user has used to login to the CSP 102, single-use passwords previously utilized by the user for access to the CSP 102, single-use passwords that are still valid for accessing the CSP 102, or some combination thereof. The authentication information may be updated based on the user logins to the CSP 102. For example, the CSP 102 may update the authentication information with a single-use password used for access to the CSP 102, such that the single-use passwords previously utilized by the user for access to the CSP 102 are updated to include an additional single-use password being used for access to the CSP 102. In some embodiments, the update of the single-use passwords previously utilized may include transmitting a copy of the single-use password, being used for access, from the region utilized for login to the other regions via a back channel communication using the back channel 110. In some embodiments, the back channel communication is a synchronous back channel communication.

In some instances, copies of the authentication information stored in the regions may differ. For example, the first authentication information 116 stored in the first region 106 may differ from the second authentication information 118 stored in the second region 108. There may be delays in replication and/or updating of the authentication information between regions that can cause the authentication data stored in different regions to be different. For example, the second authentication information 118 in the second region 108 may be replicated and/or updated at a delayed time after the first authentication information 116 in the first region 106. If a region attempts to retrieve the first authentication information 116 and the second authentication information 118 in between the time that the first authentication information 116 has been updated and/or replicated and the time that the second authentication information 118 is to be updated and/or replicated, the first authentication information 116 retrieved may be different from the second authentication information 118. Further, if one or more of the regions to which the authentication information is to be updated and/or replicated is unavailable when the updating and/or replication is to be performed, the authentication information in those one or more regions may be different from other regions.

The login region 104 may retrieve authentication information corresponding to the user to determine whether to grant access to the CSP 102 to the user. For example, the login region 104 may retrieve authentication information from one or more regions for determining whether to grant access to the user. In some embodiments, the login region 104 may determine which regions from which to retrieve the authentication information based on the login credentials 114 and/or the request for access to the CSP 102 received from the user device 112. For example, the login credentials 114 and/or the request may indicate a home region and/or a first subscribed region corresponding to the user. The login region 104 may query the home region and/or the first subscribed region for which regions from which the authentication information is to be retrieved. For example, the login credentials 114 and/or the request may indicate that the first region 106 is the home region and/or that the second region 108 is the first subscribed region in the illustrated embodiment. The login region 104 may query the first region 106 and/or the second region 108 based on the indication to determine from which regions from which the authentication information is to be retrieved. In some embodiments, the query to the first region 106 and/or the second region 108 may be made by a back channel call, such as via a call made on the back channel 110. The first region 106 and/or the second region 108 may utilize the back channel 110 to indicate the regions from which the authentication information is to be retrieved. In other embodiments, the login region 104 may store an indication of the regions from which the authentication information is to be retrieved for the user, where the login region 104 may determine the regions from which the authentication information is to be retrieved based on the stored indication.

The login region 104 may make back channel calls to the regions to retrieve the authentication information to be utilized for determining whether the user of the user device 112 is to be allowed access to the CSP 102. In the illustrated embodiment, the login region 104 may have determined that authentication information is to be retrieved from the first region 106 and the second region 108. The login region 104 may send back channel calls to the first region 106 and the second region 108 via the back channel 110. The back channel calls may request that the first region 106 provide the first authentication information 116 and that the second region 108 provide the second authentication information 118 to the login region 104. The first region 106 may provide the first authentication information 116 to the login region 104 and the second region 108 may provide the second authentication information 118 to the login region 104 in response to the back channel calls. The first region 106 and the second region 108 may provide the information via the back channel 110 to the login region 104.

The login region 104 may receive the first authentication information 116 from the first region 106 and the second authentication information 118 from the second region 108. The login region 104 may consolidate the first authentication information 116 and the second authentication information 118, or some portion thereof, to produce authentication information for determining whether the user is to be granted access to the CSP 102. For example, the login region 104 may compare the first authentication information 116 and the second authentication information 118 to identify duplicated information within the first authentication information 116 and the second authentication information 118. The login region 104 may generate combined authentication information that includes the first authentication information 116 and the second authentication information 118 without the information duplicated, where the combined authentication information may be utilized as the authentication information for the determination of whether the user is to be allowed access to the CSP 102.

The login region 104 may receive the login credentials 114 from the user device 112 and generate the authentication information based on the first authentication information 116 from the first region 106 and the second authentication information 118 from the second region 108. The login region 104 may determine whether to grant access to the user based on the login credentials 114 and the authentication information. The login region 104 may compare a passcode from the authentication information corresponding to the user with a passcode received in the login credentials 114. Further, the login region 104 may compare a single-use password received in the login credentials 114 with the previously used single-use passwords from the authentication information and/or the still valid single-use passwords from the authentication information. In some embodiments, the login region 104 may further determine whether the user device 112 is a known user device to be utilized by the user based on the login credentials 114 and/or the authentication information, and may request further verification if the user device 112 is not a known user device to be utilized by the user.

The login region 104 may determine to provide access to the CSP 102 based on the passcode provided in the login credentials 114 matching the passcode from the authentication information, the single-use password from the login credentials 114 not being included in previously utilized single-use passwords from the authentication information, the single-use password from the login credentials 114 matching one of the still valid single-use passwords from the authentication information, the user device 112 being a known user device to be utilized by the user, further verification received based on the user device 112 not being a known user device to be utilized by the user, or some combination thereof. The login region 104 may determine to deny access to the CSP 102 based on the passcode provided in the login credentials 114 not matching the passcode from the authentication information, the single-use password from the login credentials 114 being included in the previously utilized single-use passwords from the authentication information, the single-use password from the login credentials 114 not matching one of the still valid single-use passwords from the authentication information, or some combination thereof.

The authentication information being duplicated to multiple regions and being retrievable through back channels, as described in relation to the system arrangement 100, may provide for login to the CSP 102 from multiple regions within the CSP 102. For example, the authentication information being retrieved from multiple regions can allow a user to login to the CSP 102 with a reduced risk of the user logging into multiple regions with a same single-use password. Accordingly, the approach may have the advantage of usability of logging into any region within the CSP 102 while providing security.

Figure 2:
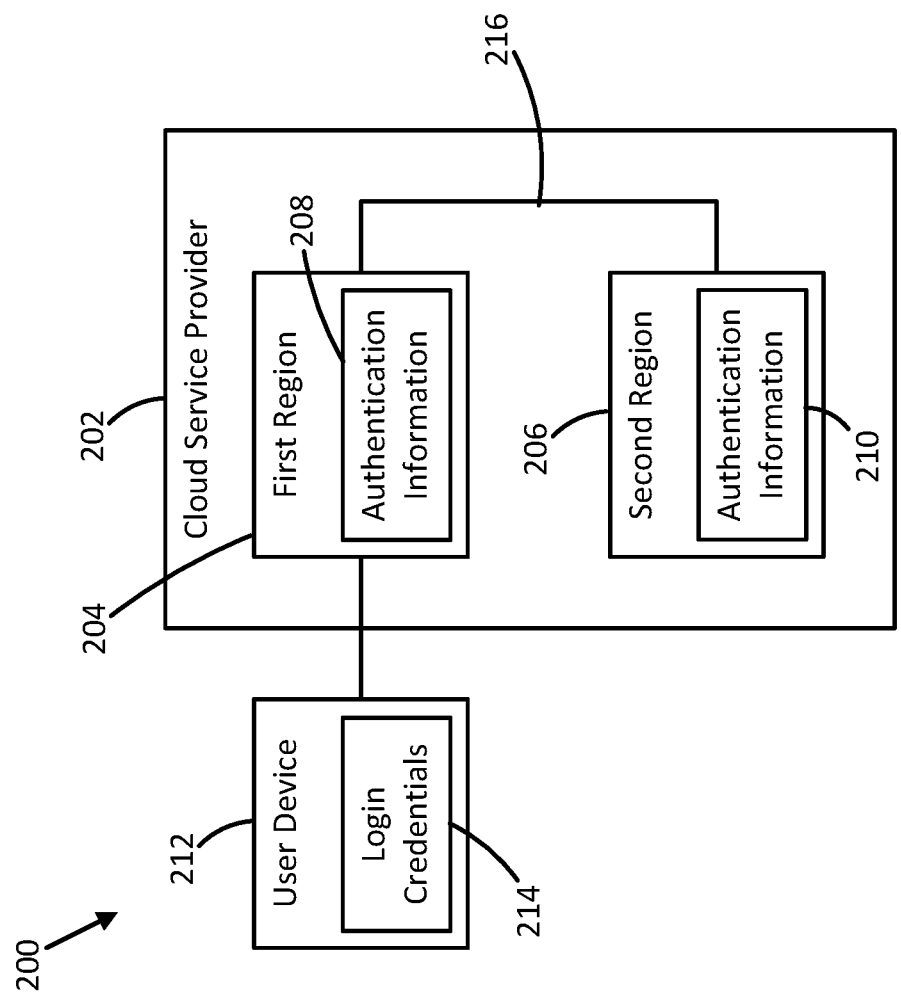
FIG. 2 illustrates another example system arrangement, according to at least one embodiment.

FIG. 2 illustrates another example system arrangement 200, according to at least one embodiment. The system arrangement 200 illustrates an example system having an IDCS stripe, or a portion thereof, replicated in multiple regions of a CSP. The system arrangement 200 illustrated shows an example of a user login through a region with the replicated IDCS stripe.

The system arrangement 200 may include a CSP 202. The CSP 202 may include one or more of the features of the CSP 102 (FIG. 1). For example, the CSP 202 may include one or more regions, such as a first region 204 and a second region 206. The first region 204 may include one or more of the features of the first region 106 (FIG. 1) and the second region 206 may include one or more of the features of the second region 108 (FIG. 1). The first region 204 may store first authentication information 208, where the first authentication information 208 may include one or more of the features of the first authentication information 116 (FIG. 1). The second region 206 may store second authentication information 210, where the second authentication information 210 may include one or more of the features of the second authentication information 118 (FIG. 1).

The system arrangement 200 may further include a user device 212. The user device 212 may include one or more of the features of the user device 112 (FIG. 1). A user may utilize the user device 212 to attempt to access the CSP 202. In the illustrated embodiment, the user device 212 may be directed to the first region 204 for login to the CSP 202. The user device 212 may be directed to the first region 204 based on: the user device 212 being geographically closest to the first region 204 of the regions of the CSP 202; the user utilizing an IP address corresponding to the first region 204 with the user device 212 to request access to the CSP 202; or some combination thereof. The CSP 202, through the first region 204, may instruct the user device 212 to display an interface for accessing the CSP 202. The user interface may include input fields for login credentials 214 to be utilized for determining whether the user is authorized to access the CSP 202. In some embodiment, the CSP 202 may further request characteristic information of the user device 212 and/or indications of results of prior login attempts as part of the login credentials 214. The login credentials 214 may include one or more of the features of the login credentials 114 (FIG. 1).

The first region 204 may receive the login credentials 214 for the user from the user device 212. The first region 204 may utilize the login credentials 214 provided by the user device 212 to determine whether the user of the user device 212 is to be allowed access to the CSP 202. In particular, the first region 204 may utilize the login credentials 214 and authentication information to determine whether the user is authorized to access the CSP 202.

The first region 204 may retrieve the first authentication information 208 of the first region 204 and the second authentication information 210 from the second region 206. The first region 204 may make a back channel call via a back channel 216 to the second region 206 to retrieve the second authentication information 210 from the second region 206. The back channel 216 may include one or more of the features of the back channel 110 (FIG. 1). The second region 206 may provide the second authentication information 210 to the first region 204 via the back channel 216. For example, the second region 206 may provide the second authentication information 210 in response to the back channel call from the first region 204.

The first region 204 may consolidate the first authentication information 208 and the second authentication information 210 to produce authentication information to be utilized for determining whether the user is to be allowed access to the CSP 202. The consolidation of the first authentication information 208 and the second authentication information 210 may be performed the same as the consolidation of the first authentication information 116 and the second authentication information 118. For example, the first region 204 may identify duplicated information within the first authentication information 208 and the second authentication information 210. The first region 204 may generate combined authentication information that includes the first authentication information 208 and the second authentication information 210 without the information duplicated, where the combined authentication information may be utilized as the authentication information for determination of whether the user is to be allowed access to the CSP 202.

The first region 204 may determine whether to provide access to the CSP 202 based on the login credentials 214 and the authentication information. The determination of whether to provide access to the CSP 202 by the first region 204 may include one or more of the features of the determination of whether to provide access to the CSP 102 performed by the login region 104 (FIG. 1). For example, the first region 204 may compare a passcode corresponding to the user from the authentication information with a passcode received in the login credentials 214. Further, the first region 204 may compare a single-use password received in the login credentials 214 with the previously used single-use passwords from the authentication information and/or the still valid single-use passwords from the authentication information. In some embodiments, the first region 204 may further determine whether the user device 212 is a known user device to be utilized by the user based on the login credentials 214 and/or the authentication information, and may request further verification if the user device 212 is not a known user device to be utilized by the user.

The first region 204 may determine to provide access to the CSP 202 based on the passcode provided in the login credentials 214 matching the passcode from the authentication information, the single-use password from the login credentials 214 not being included in previously utilized single-use passwords from the authentication information, the single-use password from the login credentials 214 matching one of the still valid single-use passwords from the authentication information, the user device 212 being a known user device to be utilized by the user, further verification received based on the user device 212 not being a known user device to be utilized by the user, or some combination thereof. The first region 204 may determine to deny access to the CSP 202 based on the passcode provided in the login credentials 214 not matching the passcode from the authentication information, the single-use password from the login credentials 214 being included in the previously utilized single-use passwords from the authentication information, the single-use password from the login credentials 214 not matching one of the still valid single-use passwords from the authentication information, or some combination thereof.

Figure 3:
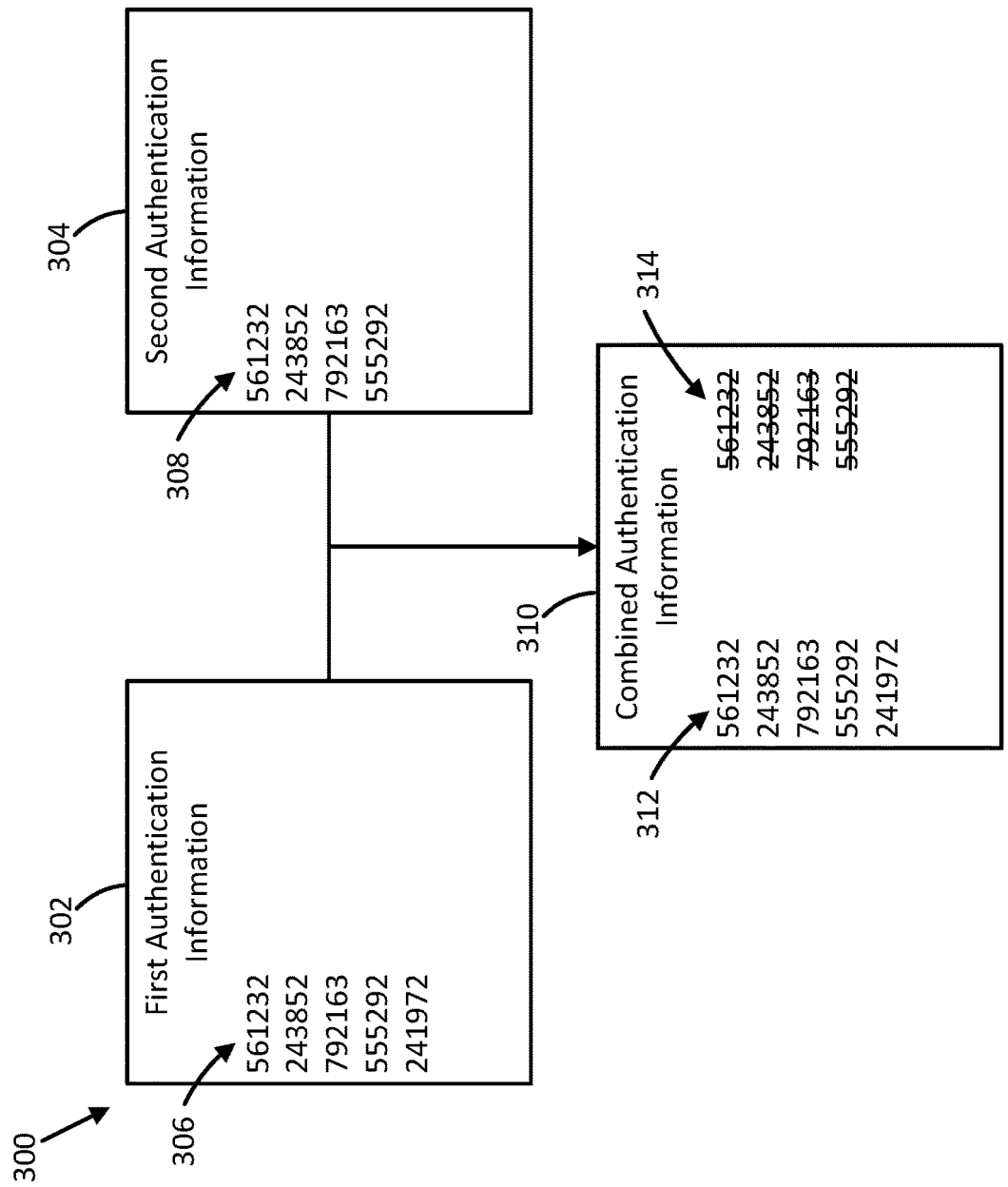
FIG. 3 illustrates an example consolidation scenario of authentication information, according to at least one embodiment.

FIG. 3 illustrates an example consolidation scenario 300 of authentication information, according to at least one embodiment. In particular, the consolidation scenario 300 illustrates example consolidation of first authentication information 302 and second authentication information 304 in accordance with some embodiments. The consolidation illustrated in the consolidation scenario 300 may be an example of consolidation of authentication information that can be performed by the login region 104 (FIG. 1) and/or the first region 204 (FIG. 2).

The consolidation scenario 300 illustrates the example first authentication information 302 and the example second authentication information 304. For brevity and clarity, the information included in the first authentication information 302 and the second authentication information 304 has been limited to previously used single-use passwords. It should be understood that first authentication information 302 and the second authentication information 304 may include additional information in embodiments and may consolidate the additional information in accordance with the approaches for consolidation described in relation to the consolidation scenario 300. For example, the first authentication information 302 and the second authentication information 304 may include one or more passcodes corresponding to a user, indications of one or more devices known to be associated with the user, one or more previously used single-use passwords associated with the user, one or more still valid single-use passwords, or some combination thereof in embodiments.

The first authentication information 302 may be stored in a first region, such as the first region 106 (FIG. 1) and/or the first region 204 (FIG. 2). The second authentication information 304 may be stored in a second region, such as the second region 108 (FIG. 1) and/or the second region 206 (FIG. 2). For example, the first authentication information 302 may be stored in memory of the first region and the second authentication information 304 may be stored in memory of the second region. In some embodiments, the memories may comprise one or more caches, where the information stored in caches may be removed and/or deleted after an amount of time being stored. The first authentication information 302 and the second authentication information 304 may comprise replicated IDCS stripes, or portions thereof. For example, the first authentication information 302 and the second authentication information 304 may be copies of an IDCS stripe (or some portion thereof) that includes information related to the user.

The first authentication information 302 may include a first set of previously utilized single-use passwords 306 and the second authentication information 304 may include a second set of previously utilized single-use passwords 308 in the illustrated embodiment. The first set of previously utilized single-use passwords 306 and the second set of previously utilized single-use passwords 308 may comprise single-use passwords previously utilized by the user to sign in to a CSP (such as the CSP 102 (FIG. 1) and/or the CSP 202 (FIG. 2)). The first set of single-use passwords 306 and the second set of single-use passwords 308 may be copies of a set of previously utilized single-use passwords included in a IDCS stripe that has been replicated in the regions corresponding to the first authentication information 302 and the second authentication information 304.

In the illustrated embodiment, the first set of single-use passwords 306 and the second set of single-use passwords 308 include different single-use passwords. The difference in the single-use passwords between the first set of single-use passwords 306 and the second set of single-use passwords 308 may be due to different times that the first authentication information 302 and the second authentication information 304 were updated. For example, update of one of the first authentication information 302 or the second authentication information 304 may have been delayed in updating compared to the other due to delays in the CSP in updating the corresponding regions and/or due to one of the regions being unavailable at a time for update. In the illustrated embodiment, the second authentication information 304 may have been delayed in updating resulting in the second set of single-use passwords 308 having one less single-use password (shown as password '241972' in the illustrated embodiment) than the first set of single-use passwords 306.

A region of the CSP determining whether to allow access to the user may retrieve the first authentication information 302 and the second authentication information 304. The region may combine the first authentication information 302 and the second authentication information 304 to produce combined authentication information 310. The region may consolidate the first authentication information 302 and the second authentication information 304 to produce the combined authentication information 310.

As part of the consolidation, the region may identify duplicate information and/or differences in information within the first authentication information 302 and the second authentication information 304. In instances where the region identifies duplicate information in the first authentication information 302 and the second authentication information 304, the region may remove the duplication of the information in generating the combined authentication information 310. In instances where the region identifies differences in the information, the region may determine whether to include or exclude the information that is different to generate the combined authentication information 310. Whether the information that is different is included or excluded may be determined based on the type of information.

In the illustrated embodiment, the combined authentication information 310 is shown with a copy of the first set of previously utilized single-use passwords 312 and a copy of the second set of previously utilized single-use passwords 314. The region may identify the duplicated single-use passwords in the copy of the first set of previously utilized single-use passwords 312 and the copy of the second set of previously utilized single-use passwords 314. In the illustrated example, the region may determine that the values of '561232,' '243852,' '792163,' and '555292' are duplicated in the copy of the first set of previously utilized single-use passwords 312 and the copy of the second set of previously utilized single-use passwords 314. The region may remove the duplicated single-use passwords from one of the copies of the previously utilized single-use passwords to produce the combined authentication information 310. In the illustrated example, the region determined to remove the duplicated single-use passwords from the copy of the second set of previously utilized single-use passwords 314 to produce the combined authentication information 310, as shown by the strikethrough through the duplicated single-use passwords in the copy of the second set of previously utilized single-use passwords 314. In some instances, the region may proceed to utilize the remaining previously utilized single-use passwords in the combined authentication information 310 to determine whether the user is to be allowed access to the CSP.

In some embodiments, the region may further or alternatively define the differences between the first authentication information 302 and the second authentication information 304. In the illustrated embodiments, the region may identify the differences between the copy of the first set of previously utilized single-use passwords 312 and the copy of the second set of previously utilized single-use passwords 314. In particular, the region may determine that the value of '241972' exists in the copy of the first set of previously utilized single-use passwords 312, but is not included in the copy of the second set of previously utilized single-use passwords 314. The region may determine whether to remove or maintain the differences based on the type of information that is different. For example, the region may determine to maintain the value of '241972' based on the difference being for the type of information of previously utilized single-use passwords. For other types of information, the differences may be removed or maintained. Accordingly, the value of '241972' is included in the combined authentication information 310.

Once the combined authentication information 310 has been generated, the combined authentication information 310 may be utilized for determining whether the user is to be allowed to access the CSP. In particular, the region may utilize the combined authentication information 310 as the authentication information for determining whether the user is to be allowed access to the CSP. For example, the region may compare the combined authentication information 310 with login credentials (such as the login credentials 114 (FIG. 1) and/or the login credentials 214 (FIG. 2)) received from the user to determine whether the user is to be allowed to access the CSP. In the illustrated embodiment, the region may compare a single-use password provided by the user in the login credentials with the first set of previously utilized single-use passwords 312 included in the combined authentication information 310. If the region determines that the single-use password provided by the user matches any of the single-use passwords in the first set of previously utilized single-use passwords 312, the region may determine that that the user is not to be granted access to the CSP based at least in part on the single-use password provided by the user.

Figure 4:
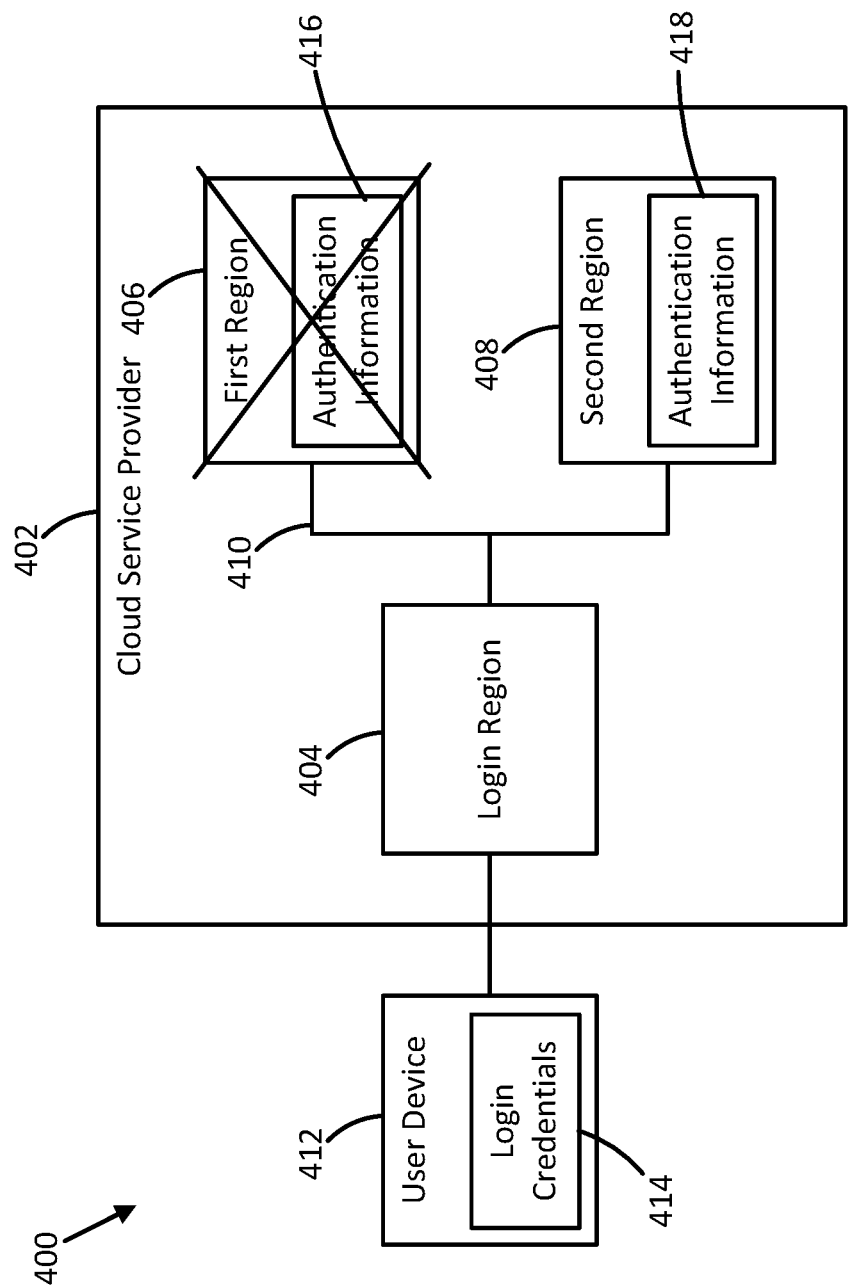
FIG. 4 illustrates another example system arrangement, according to at least one embodiment.

FIG. 4 illustrates another example system arrangement 400, according to at least one embodiment. The system arrangement 400 illustrates an example system having an IDCS stripe, or a portion thereof, replicated in multiple regions of a CSP. The system arrangement 400 illustrated shows an example of a user login through a login region. The system arrangement 400 may have one or more regions that are unavailable.

The system arrangement 400 may include a CSP 402. The CSP 402 may include one or more of the features of the CSP 102 (FIG. 1) and/or the CSP 202 (FIG. 2). The CSP 402 may include a login region 404. The login region 404 may include one or more of the features of the login region 104 (FIG. 1). The login region 104 may be utilized for logging in to the CSP 402 and may determine whether a user is authorized to log in to the CSP 402. The CSP 402 may further include a first region 406 and a second region 408. The first region 406 may include one or more of the features of the first region 106 (FIG. 1) and/or the first region 204 (FIG. 2). The second region 408 may include one or more of the features of the second region 108 (FIG. 1) and/or the second region 206 (FIG. 2).

The login region 404 may be coupled to the first region 406 and the second region 408. For example, the login region 404 may be coupled to the first region 406 and the second region 408 via a back channel 410. The back channel 410 may include one or more of the features of the back channel 110 (FIG. 1) and/or the back channel 216 (FIG. 2). The back channel 410 may connect the login region 404, the first region 406, and/or the second region 408. The back channel 410 may provide direct connections between the regions or a shared connection between the regions. For example, the back channel 410 may provide a direct connection between the login region 404 and the first region 406, another direct connection between the login region 404 and the second region 408, and/or another direct connection between the first region 406 and the second region 408 in some embodiments. In other embodiments, the back channel 410 may provide a shared connection among the login region 404, the first region 406, and the second region 408.

The system arrangement 400 may include one or more user devices that connect with the CSP 402. For example, the system arrangement 400 includes a user device 412 in the illustrated embodiment. The user device 412 may include one or more of the features of the user device 112 (FIG. 1) and/or the user device 212 (FIG. 2). A user may utilize the user device 412 to request access to the CSP 402. For example, the user may enter an IP address corresponding to the CSP 402 (or some portion thereof) into a browser of the user device 412 to request access to the CSP 402. The CSP 402 (or some portion thereof) may instruct the user device 412 to display a user interface for accessing the CSP 402. The user interface may include input fields for login credentials 414 to be utilized for determining whether the user is authorized to access the CSP 402. In some embodiments, the CSP 402 may request characteristic information of the user device 412 and/or indications of results of prior login attempts as part of the login credentials 414.

The user device 412 may obtain login credentials 414 for login of a user using the user device 412. For example, the user device 412 may receive login credentials 414 from a user using the user device 412 and/or retrieve information indicating characteristics of the user device 412 (such as an identifier, key, and/or other values associated with the user device 412). The login credentials 414 may include inputs from a user, such as a passcode and/or a single-use password. In some embodiments, the single-use password may be a TOTP. The single-use password may be generated by a program related to the CSP 402. In particular, the program may generate a single-use password and may provide the single-use password to the user and to the CSP 402. The program may provide the single-use password to the user via an email account associated with the user, a telephone number associated with the user (such as via text messaging and/or voice messaging), software executing on the user device 412 that can receive the single-use password from the program related to the CSP 402, and/or via other approaches known in the art for providing single-use passwords to a user. During a login process, the CSP 402 may request input of the single-use password from the user of the user device 412, e.g., in a displayed login interface. The user may input the single-use password with other user credentials (such as a password associated with the user) into the user device 412, where the user device 412 may generate login credentials that include the single-use password and the other user credentials. During the login process, the user device 412 may provide the login credentials 414 to the CSP 402 to be utilized by the CSP 402 for determining whether to allow the user to log in to the CSP 402.

In some embodiments, the login credentials 414 received from the user device 412 may further include information related to previous login attempts and/or previous logins initiated by the user device 412. For example, the user device 412 may maintain a count of how many consecutive times that the user of the user device 412 attempted to log in to the CSP 402 and failed. The user device 412 may include an indication of the number of times that the user consecutively failed to log in to the CSP 402 in the login credentials 414. In other embodiments, the CSP 402 may maintain a count of how many consecutively failed login attempts were made by the user device 412 and/or for accessing an account of a particular customer. The CSP 402 may determine whether the number of consecutively failed login attempts has exceeded a threshold number of attempts and may determine that the user is not to be provided access to the CSP 402 based on the number of consecutively failed login attempts exceeding the threshold number of attempts.

In the illustrated embodiment, the user device 412 may be directed to the login region 404 during the login process to the CSP 402. The user device 412 may be directed to the login region 404 based on: the user device 412 being geographically closest to the login region 404 compared to the other regions of the CSP 402; the login region 404 being the geographically closest region of the CSP 402 to the user device 412 that is available, the IP address utilized by the user device 412 as part of the login process corresponding to the login region 404; the user device 412 indicated a selection of the login region 404 to be utilized for the login process; or some combination thereof. As a result of being directed to login region 404, the user device 412 provides the login credentials 414 to the login region 404 as part of the login process.

The login region 404 may utilize the login credentials 414 provided by the user device 412 to determine whether the user of the user device 412 is to be allowed access to the CSP 402. For example, the login region 404 may use authentication information in combination with the login credentials 414 to determine whether the user is to be allowed access to the CSP 402. Authentication information for determining whether a user is to be allowed to access the CSP 402 may be stored in two or more regions of the CSP 402. However, there may be regions of the CSP 402 that do not have the authentication information corresponding to the user stored, where the user may still be able to login to the CSP 402 in regions that do not have the authentication information corresponding to the user stored.

In some embodiments, authentication information corresponding to a user may be stored in a home region corresponding to the user and a first subscribed region corresponding to the user. In the illustrated embodiment, the first region 406 may store first authentication information 416 corresponding to the user and the second region 408 may store second authentication information 418 corresponding to the user. The first authentication information 416 may be, or may be part of, an IDCS stripe maintained within the first region 406 and the second authentication information 418 may be, or may be part of, the IDCS stripe replicated within the second region 408. In some embodiments, the first region 406 may be a home region for the user and the second region 408 may be a first subscribed region. The user, or an entity associated with the user, may be able to define the home region and/or the first subscribed region corresponding to the user. In the illustrated embodiment, the login region 404 does not store authentication information corresponding to the user.

The authentication information may include information for determining whether the user is authorized to access the CSP 402 and/or information related to previous logins of the user. For example, the authentication information may include a passcode corresponding to the user, an indication of one or more devices which the user has used to login to the CSP 402, single-use passwords previously utilized by the user for access to the CSP 402, single-use passwords that are still valid for accessing the CSP 402, or some combination thereof. The authentication information may be updated based on the user logins to the CSP 402. For example, the CSP 402 may update the authentication information with a single-use password used for access to the CSP 402, such that the single-use passwords previously utilized by the user for access to the CSP 402 are updated to include an additional single-use password being used for access to the CSP 402. The updating to include the single-use password may include providing a copy of the single-use password via the back channel 410 to one or more regions that did not receive the single-use password during login. In some embodiments, the single-use password may be provided by a synchronized communication on the back channel 410. For example, in instances where the first region 406 received the single-use password as part of a login, the first region 406 provides a copy of the single-use password to the second region 408 via a synchronized communication on the back channel 410 to cause the second authentication information 418 to be updated with the single-use password.

Based on receiving a request for access to the CSP 402 with the login credentials 414, the login region 404 may query two or more regions of the CSP 402, that have authentication information stored for the user, for the authentication information. For example, the login region 404 may query the first region 406 for the first authentication information 416 and second region 408 for the second authentication information 418 in the illustrated embodiment. In the illustrated instance, the first region 406 is unavailable. Since the first region 406 is unavailable, the first region 406 may not receive the query for the first authentication information 416 and/or may not provide the first authentication information 416 to the login region 404 in response to the query for the first authentication information 416. The second region 408 may still receive the query for the second authentication information 418 and provide the second authentication information 418 to the login region 404.

After sending queries for the first authentication information 416 to the first region 406 and for the second authentication information 418 to the second region 408, the login region 404 may await responses from the first region 406 and the second region 408. The login region 404 may determine that the first region 406 is unavailable based on not receiving a response from the first region 406. In some embodiments, the login region 404 may determine that the first region 406 is unavailable based on a response not being received from the first region 406 within a defined period of time.

In other embodiments, the login region 404 may be aware that the first region 406 is unavailable. In these embodiments, the login region 404 may query the second region 408 for the second authentication information 418 and skip querying the first region 406 for the first authentication information 416 based on receiving a request for access to the CSP 402. The login region 404 may avoid querying the first region 406 based on the login region 404 being aware that the first region 406 is unavailable. In these embodiments, the login region 404 may not wait for a period of time to determine that the first region 406 does not respond. Accordingly, there can be less delay in retrieving authentication information to be utilized for determining whether the user of the user device 412 is to be allowed access to the CSP 402 based on not having to wait to determine that the first region 406 is not going to respond to an inquiry for the first authentication information 416.

The login region 404 may determine that the second authentication information 418 received from the second region 408 is to be utilized for determining whether the user is allowed to access the CSP 402 based on the determination that the first region 406 is unavailable. For example, the login region 404 may determine whether the user is allowed to access the CSP 402 based on the login credentials 414 and the second authentication information 418. The login region 404 may compare a passcode from the second authentication information 418 corresponding to the user with a passcode received in the login credentials 414. Further, the login region 404 may compare a single-use password received in the login credentials 414 with the previously used single-use passwords from the second authentication information 418 and/or the still valid single-use passwords from the second authentication information 418. In some embodiments, the login region 404 may further determine whether the user device 412 is a known user device to be utilized by the user based on the login credentials 414 and/or the second authentication information 418, and may request further verification if the user device 412 is not a known user device to be utilized by the user.

The login region 404 may determine to provide access to the CSP 402 based on the passcode provided in the login credentials 414 matching the passcode from the second authentication information 418, the single-use password from the login credentials 414 not being included in previously utilized single-use passwords from the second authentication information 418, the single-use password from the login credentials 414 matching one of the still valid single-use passwords from the second authentication information 418, the user device 412 being a known user device to be utilized by the user, further verification received based on the user device 412 not being a known user device to be utilized by the user, or some combination thereof. The login region 404 may determine to deny access to the CSP 402 based on the passcode provided in the login credentials 414 not matching the passcode from the second authentication information 418, the single-use password from the login credentials 414 being included in the previously utilized single-use passwords from the second authentication information 418, the single-use password from the login credentials 414 not matching one of the still valid single-use passwords from the second authentication information 418, or some combination thereof.

In instances where the home region for the user is unavailable or the user selects to login to a region other than the home region corresponding to the user, the user may be provided access to the CSP 402 via one of the available regions which was utilized to determine that the user was to be allowed access to the CSP 402. For example, the user may be authenticated via the first subscribed region to determine that the user is allowed access to the CSP 402 and the first subscribed region may provide access to the CSP 402 to the user when the home region is unavailable or when the user selects to login to the first subscribed region. In instances where one of the regions other than the home region provides access to the CSP 402 for a user, the operations that the user is allowed to perform may be limited in some sense. For example, where a region other than the home region provides access to the CSP 402, the user may be limited to read-only access to the CSP 402. In contrast, when the home region provides access to the CSP 402, the user may have both read and write access to the CSP 402.

In the illustrated embodiment, the first region 406 may be defined as the home region for the user of the user device 412 and the second region 408 may be defined as the first subscribed region for the user. As the user signs into the second region 408 in the illustrated embodiment, the second region 408 may limit operations that can be performed by the user with the CSP 402. For example, the second region 408 may provide read-only access to the CSP 402.

In instances where the second region 408 provides access to the CSP 402, the second region 408 may update the second authentication information 418 to include a least a portion of the information from the login credentials 414. For example, the second region 408 may store a single-use password received in the login credentials 414. In some embodiments, the second region 408 may store the single-use password along with other previously utilized single-use passwords in the second authentication information 418. Since the first region 406 is unavailable, the first region 406 may not update the first authentication information 416 with the portion of the information from the login credentials 414. For example, the first region 406 may not update the first authentication information 416 with the single-use password from the login credentials 414. Accordingly, there may be differences in the first authentication information 416 and the second authentication information 418 based on the second region 408 updating the second authentication information 418 and the first region 406 not updating the first authentication information 416.

When the first region 406 becomes available again, one or more operations may be performed with the first region 406 based on the first region 406 being unavailable in some embodiments. For example, in embodiments where the login region 404 is aware that the first region 406 is unavailable, an operation may be performed to indicate to the login region 404 that the first region 406 is available again. In some embodiments, the login region 404 may query the first region 406 for a response at certain intervals and/or at the performance of certain operations to determine whether the first region 406 has become available again. In these embodiments, the first region 406 may respond with an indication that the first region 406 has become available again once the first region 406 is available. In some embodiments, the first region 406 may transmit an indication that the first region 406 is available to the login region 404 in response to the first region 406 becoming available again.

In some embodiments, the first region 406 may update the first authentication information 416 in response to the first region 406 becoming available again. For example, the first region 406 may transmit queries to one or more other regions to determine whether the other regions have updated authentication since the first region 406 became unavailable. In the illustrated embodiment, the first region 406 may transmit a query via the back channel 410 to the second region 408 in response to the first region 406 becoming available again. The second region 408 may transmit the second authentication information 418 to the first region 406 in response to the query. The first region 406 may compare the first authentication information 416 to the second authentication information 418 in some embodiments to determine whether any updates have been made to the second authentication information 418 while the first region 406 was unavailable. In some embodiments, the first region 406 may be aware of a time that the first region 406 became unavailable and may determine updates that have been applied to the second authentication information 418 after the time that the first region 406 became unavailable and prior to a time that the first region 406 becomes available again. The first region 406 may update the first authentication information 416 based on the determined updates. In other embodiments, the query sent to the second region 408 by the first region 406 may indicate a time that the first region 406 became unavailable. In these embodiments, the second region 408 may provide a portion of the second authentication information 418 updated after the indicated time. The first region 406 may update the first authentication information 416 with portion of the second authentication information 418 updated after the indicated time provided by the second region 408.

Figure 5:
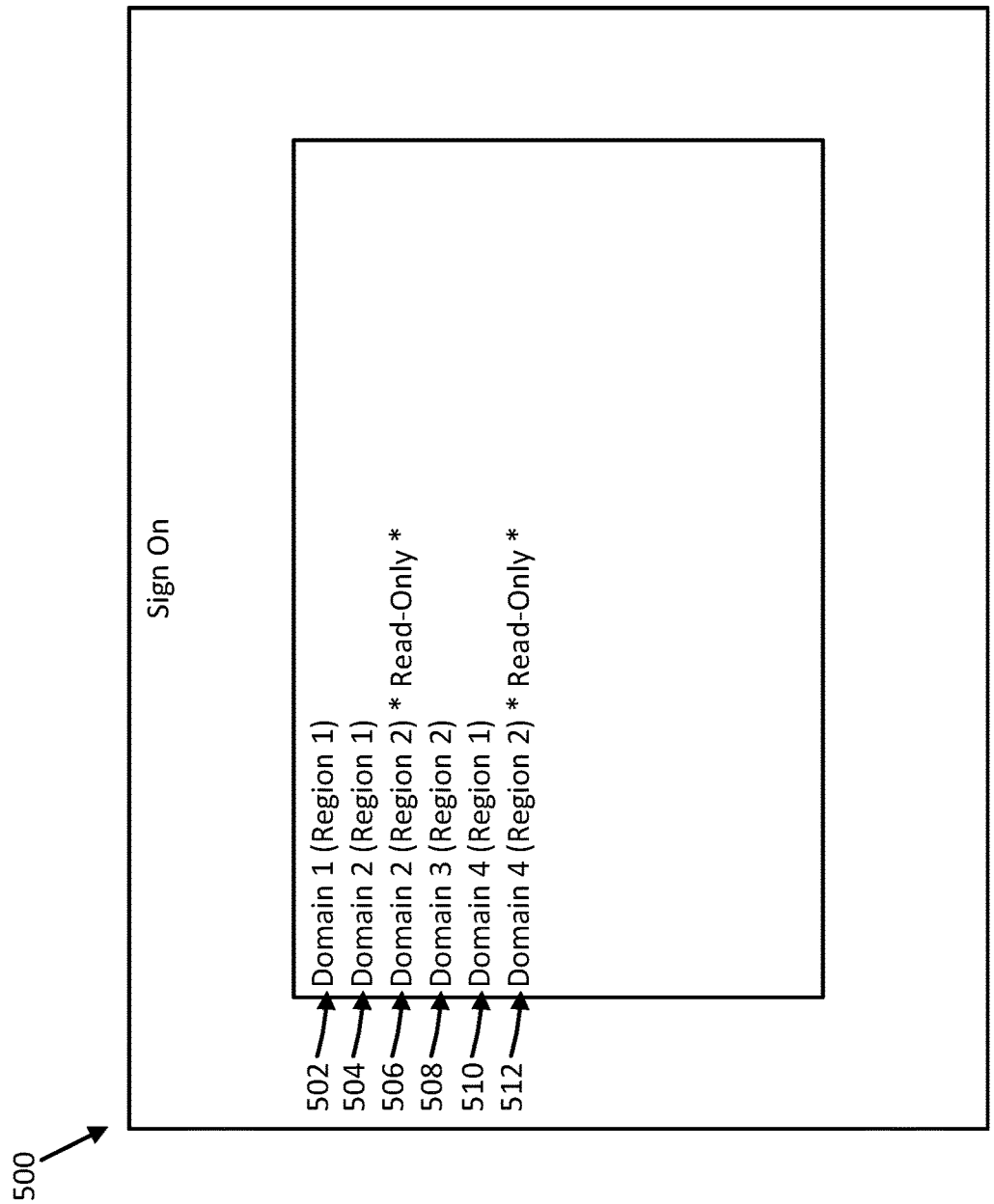
FIG. 5 illustrates an example sign-on interface, according to at least one embodiment.

FIG. 5 illustrates an example sign-on interface 500, according to at least one embodiment. For example, the sign-on interface 500 may be displayed on a user device (such as the user device 112 (FIG. 1), the user device 212 (FIG. 2), and/or the user device 412 (FIG. 4)) for sign in to a CSP (such as the CSP 102 (FIG. 1), the CSP 202 (FIG. 2), and/or the CSP 402 (FIG. 4)). The sign-on interface 500 may be provided to the user device by region of the CSP, such as a login region (such as the login region 104 (FIG. 1) and/or the login region 404 (FIG. 4)), a first region (such as the first region 106 (FIG. 1), the first region 204 (FIG. 2), and/or the first region 406 (FIG. 4)), a second region (such as the second region 108 (FIG. 1), the second region 206 (FIG. 2), and/or the second region 408 (FIG. 4)), or some combination thereof.

The sign-on interface 500 may comprise a user interface displayed on the user device. The sign-on interface 500 may include indications of one or more entities to which a user of the user device may attempt to sign in to the UE. The entities may comprise domains, regions, or some combination thereof. In some embodiments, the user interface may further indicate characteristics of one or more of the entities. For example, the user interface may indicate whether the entities provide read and/or write capabilities or read-only capabilities.

In the illustrated embodiment, the sign-on interface 500 indicates that the user may attempt to sign in to domain 1, domain 2, domain 3, and domain 4 of the CSP. For example, a first indication 502 indicates that the user may attempt to sign in to domain 1. A second indication 504 and a third indication 506 indicate that the user may attempt to sign in to domain 2. A fourth indication 508 indicates that the user may attempt to sign in to domain 3. A fifth indication 510 and a sixth indication 512 indicate that the user may attempt to sign in to domain 4.

Further, the sign-on interface 500 indicates a region for which may be utilized for accessing the domains in the illustrated embodiment. For example, the first indication 502 indicates that region 1 may be utilized for signing in to domain 1. The second indication 504 indicates that region 1 may be utilized for signing in to domain 2. The third indication 506 indicates that region 2 may be utilized for signing in to domain 2. The fourth indication 508 indicates that region 2 may be utilized for signing in to domain 3. The fifth indication 510 indicates that region 1 may be utilized for signing in to domain 4. The sixth indication 512 indicates that region 2 may be utilized for signing in to domain 4.

In the illustrated embodiment, the sign-on interface 500 indicates characteristics for some of the indications. For example, the third indication 506 indicates that the sign-in option corresponding to the third indication 506 provides read-only access. Further, the sixth indication 512 indicates that the sign-in option corresponding to the sixth indication 512 provides read-only access.

A user of the user device may select one of the indications to attempt to sign in to the CSP via the entity. For example, the user may select the first indication 502 to attempt to sign in to the CSP via domain 1 and region 1. Based on the selection of the indication, a login request may be provided to the selected entity. For example, if the user selects the first indication 502, the login request may be sent to region 1 requesting login to domain 1 of the CSP. If region 1 is unavailable, the list of indications may be refreshed without the first indication 502 being displayed. The user may then select a different indication to attempt to sign-in to a different entity. If region 1 is available, region 1 may respond to the login request.

Once an available region responds to the login request, a request for at least a portion of login credentials (such as the login credentials 114 (FIG. 1), the login credentials 214 (FIG. 2), and/or the login credentials 414 (FIG. 4)) may be displayed on the user device. The user may input at least the portion of the login credentials and the login procedure may proceed as described throughout this disclosure.

Figure 6:
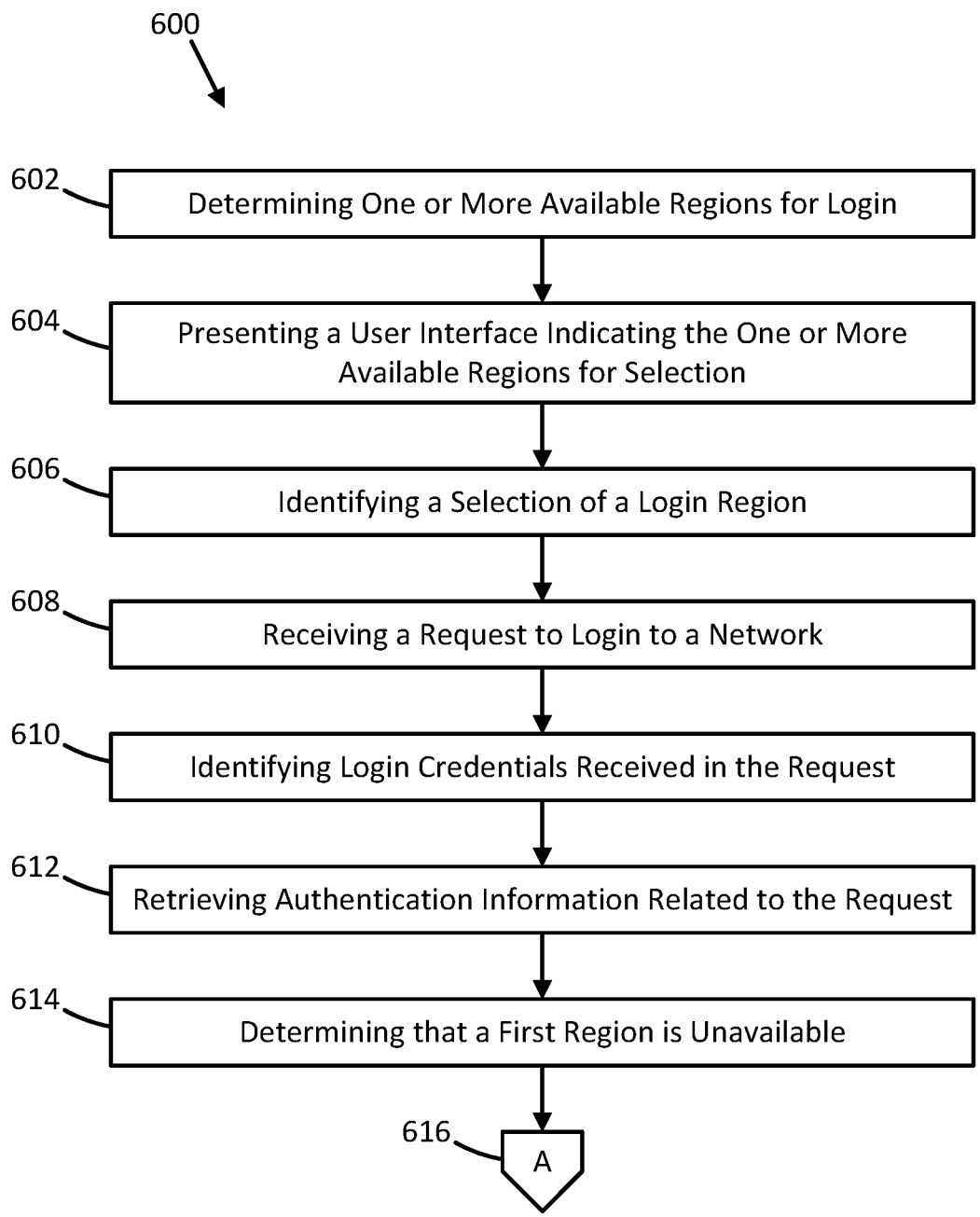
FIG. 6 illustrates an example procedure related to signing in to a cloud service provider (CSP), according to at least one embodiment.
Figure 7:
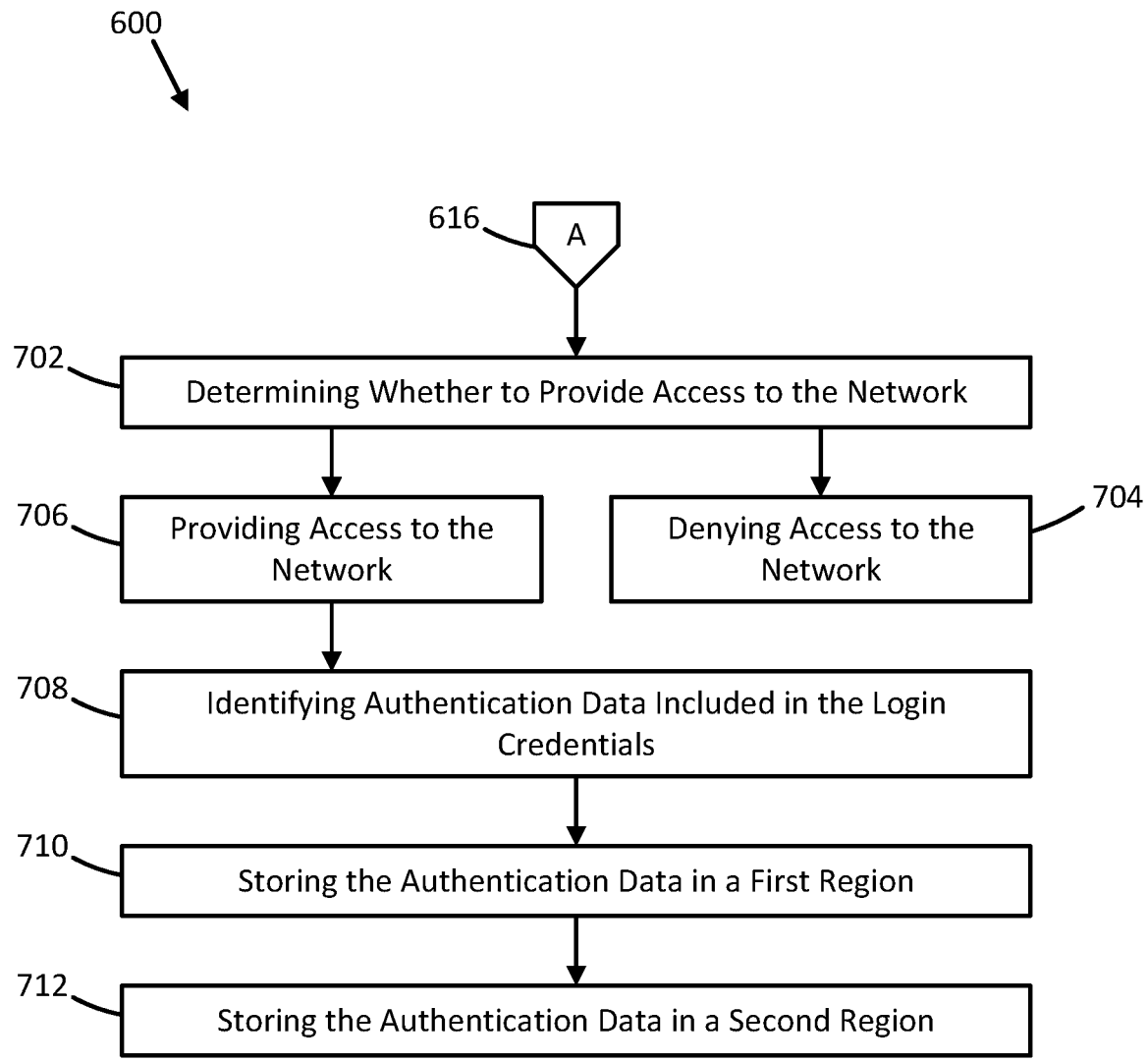
FIG. 7 illustrates a second part of the example procedure of FIG. 6, according to at least one embodiment.

FIG. 6 illustrates a first part of an example procedure 600 related to signing in to a CSP, according to at least one embodiment. FIG. 7 illustrates a second part of the example procedure 600 of FIG. 6, according to at least one embodiment. The procedure 600 may be performed by a CSP, or some portion thereof. For example, the procedure 600 may be performed by a login region (such as the login region 104 (FIG. 1) and/or the login region 404 (FIG. 4)), a first region (such as the first region 106 (FIG. 1), the first region 204 (FIG. 2), and/or the first region 406 (FIG. 4)), a second region (such as the second region 108 (FIG. 1), the second region 206 (FIG. 2), and/or the second region 408 (FIG. 4)), or some combination thereof.

In 602, the CSP may determine one or more available regions for login. For example, the CSP may store an indication of one or more available regions that are available for login. The CSP may determine one or more available regions based on the stored indication. In other embodiments, the CSP may query one or more regions to determine which regions are available for login. The CSP may determine which regions are available for login based on responses to the queries. In some embodiments, 602 may be omitted.

In 604, the CSP may present a user interface indicating the one or more available regions for selection. For example, the CSP may present a user interface indicating the one or more available regions for selection of a login region from the one or more available regions. In some embodiments, the user interface may include a sign-on interface, such as the sign-on interface 500 (FIG. 5). In some embodiments, 604 may be omitted.

In 606, the CSP may identify a selection of the login region from the one or more available regions. For example, the CSP may identify a selection by a user of one of the regions from the one or more available regions displayed within the user interface to be utilized as the login region. In some embodiments, the selected region may be a first region (such as the first region 106 (FIG. 1), the first region 204 (FIG. 2), and/or the first region 406 (FIG. 4)) or a second region (such as the second region 108 (FIG. 1), the second region 206 (FIG. 2), and/or the second region 408 (FIG. 4)). In some embodiments, 606 may be omitted.

In 608, the CSP may receive a request to login to a network. For example, the CSP may receive a request to log in to a network of the CSP. In some embodiments, the request may be received at the login region of 606 based at least in part on the identification of the selection of the login in region. In some embodiments, the request may be received at a first region of the CSP separate from two or more regions from which authentication information related to the request are retrieved.

In 610, the CSP may identify login credentials received in the request. For example, the CSP may identify login credentials received in the request received in 608. In some embodiments, the login credentials may include a single-use password provided in the request received in 608.

In 612, the CSP may retrieve authentication information related to the request. For example, the CSP may retrieve, from two or more regions of the CSP, authentication information related to the request received in 608. The authentication information may include first authentication information (such as the first authentication information 116 (FIG. 1), the first authentication information 208 (FIG. 2), and/or the first authentication information 416 (FIG. 4)), second authentication information (such as the second authentication information 118 (FIG. 1), the second authentication information 210 (FIG. 2), and/or the second authentication information 418 (FIG. 4)), or some combination thereof. In some embodiments, the authentication information may include one or more previously used single-use passwords corresponding to an account associated with the request received in 608. In some embodiments, retrieving the authentication information includes making back channel calls to the two or more regions.

In some embodiments, retrieving the authentication information may include retrieving the authentication information from a home region for an account associated with the request and a first subscribed region for the account. In some embodiments, retrieving the authentication information includes retrieving first authentication information from the home region and retrieving second authentication information from the first subscribed region.

The CSP may consolidate the first authentication information and the second authentication information to produce the authentication information. For example, the CSP may consolidate the first authentication information and the second authentication in accordance with description of consolidating the information described in relation to FIG. 3. In some embodiments, consolidating the first authentication information and the second authentication information may include generating combined authentication information that includes the first authentication information and the second authentication information. The CSP may identify a first copy of particular authentication information in the combined authentication, the first copy of the particular authentication information being from the first authentication information. The CSP may further identify a second copy of the particular authentication information in the combined authentication information, the second copy of the particular authentication information being from the second authentication information. The CSP may remove one of the first copy or the second copy of the particular authentication information from the combined authentication information to produce the authentication information.

In 614, the CSP may determine that a first region is unavailable. For example, the two or more regions from the which the authentication information is retrieved may comprise a first region and a second region. The CSP may determine that the first region is unavailable. In these instances, retrieving the authentication information may include bypassing a first back channel call to the first region to retrieve the authentication information based at least in part on the determination that the first region is unavailable. Retrieving the authentication information may include making a second back channel call to the second region to retrieve the authentication information. In some instances, 614 may be omitted.

The procedure 600 may proceed from 614 to 616. 616 from FIGS. 6 and 616 from FIG. 7 indicate that the procedure 600 continues from FIG. 6 to FIG. 7. As 616 from FIG. 7 proceeds to 702, the procedure 600 may proceed from 614 from FIGS. 6 to 702 from FIG. 7.

In 702, the CSP may determine whether to provide access to the network. For example, the CSP may determine, based at least in part on the login credentials and the authentication information, whether to provide access to the network. In some embodiments, determining whether to provide access to the network includes determining to provide access to the network based at least in part on the single-use password from the login credentials being absent from the one or more previously used single-use passwords included in the authentication information retrieved in 612.

Based on the results of the determination in 702, the procedure 700 may proceed from 702 to 704 or 706. In particular, if the CSP determines not to provide access to the network, the procedure 700 may proceed from 702 to 704. If the CSP determines to provide access to the network, the procedure 700 may proceed from 702 to 706.

In 704, the CSP may deny access to the network. For example, the CSP may deny access to the network in accordance with a determination not to provide access to the network in 702. In instances where 704 is executed, the procedure 700 may terminate after 704.

In 706, the CSP may provide access to the network. For example, the CSP may provide access to the network in accordance with a determination to provide access to the network. In instances where 706 is executed, the procedure 700 may proceed from 706 to 708.

In 708, the CSP may identify authentication data included in the login credentials. In some embodiments, the authentication data may comprise the login credentials, or some portion thereof, identified in 610. In some embodiments, 708 may be omitted.

In 710, the CSP may store the authentication data in a first region. For example, the CSP may store the authentication data in a first region of the two or more regions from which the authentication is retrieved. The authentication data stored may be utilized for future login attempts. In some embodiments, 710 may be omitted.

In 712, the CSP may store the authentication data in a second region. For example, the CSP may store the authentication data in a second region of two or more regions from which the authentication information is retrieved. The authentication data stored may be utilized for the future login attempts. In some embodiments, storing the authentication data in the second region may include replicating the authentication data from the first region to second region via a synchronized back channel communication between the first region and the second region. In some embodiments, 712 may be omitted.

While FIG. 7 may be interpreted to imply an order of the procedure 700, it should be understood that the operations of the procedure 700 may be applied in a different order in other embodiments and/or one or more of the operations of the procedure 700 may be concurrently. Further, it should be understood that one or more of the operations of the procedure 700 may be omitted in other embodiments and/or one or more additional operations may be included in the procedure 700 in other embodiments.

The approaches and procedures described throughout this disclosure may allow a user to login from more than region. For example, legacy approaches may limit login to a single region, such as a home region. The legacy approaches may limit the login to a single region to limit the chances for authentication information to be improperly obtained by third parties and to prevent differences in authentication information that may occur between different regions. The approaches and procedures described herein may address these issues to provide login via multiple regions while continuing to provide proper protection of the authentication information and handle differences that may occur between authentication information in different regions.

Example Infrastructure as Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
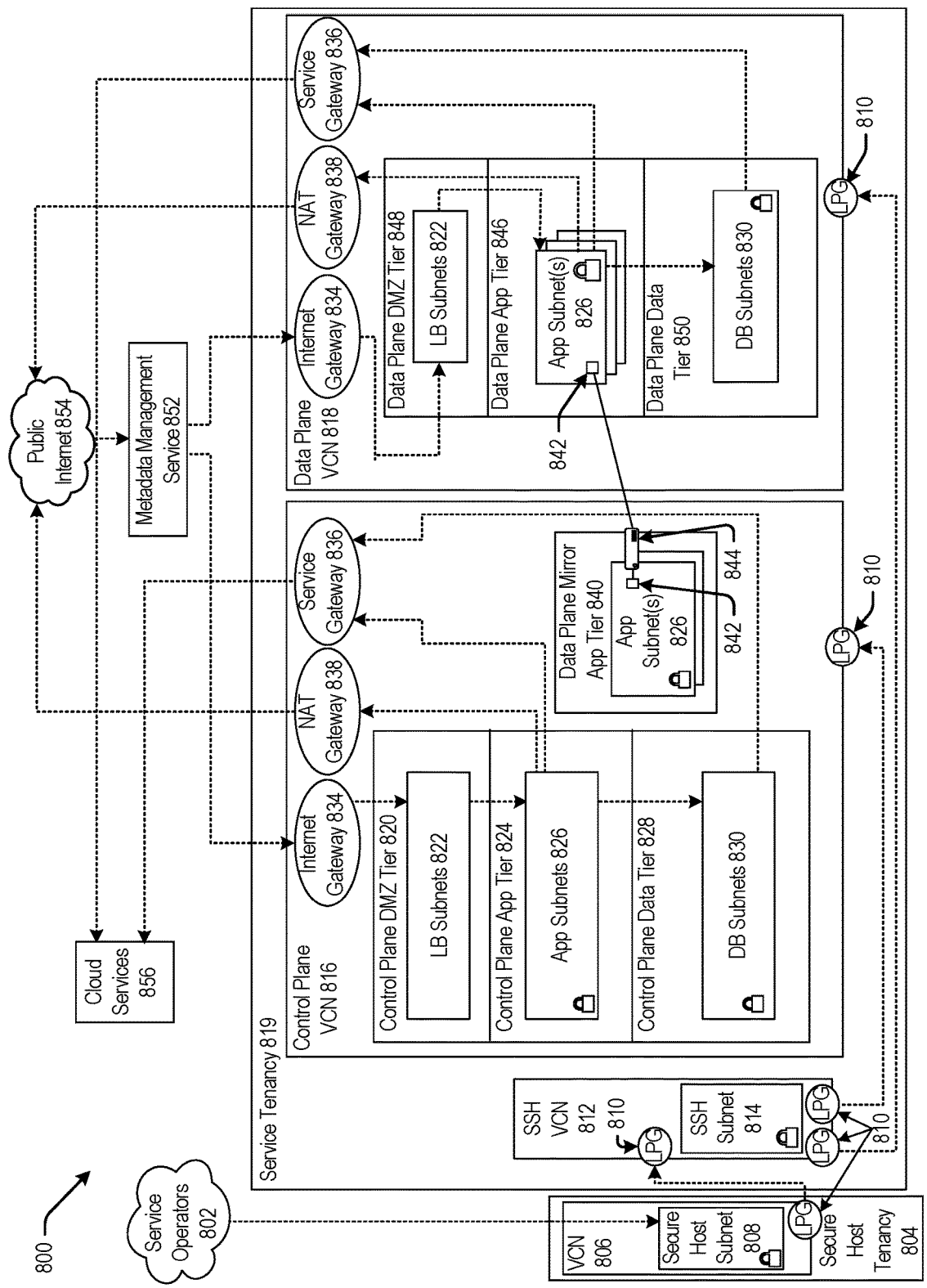
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
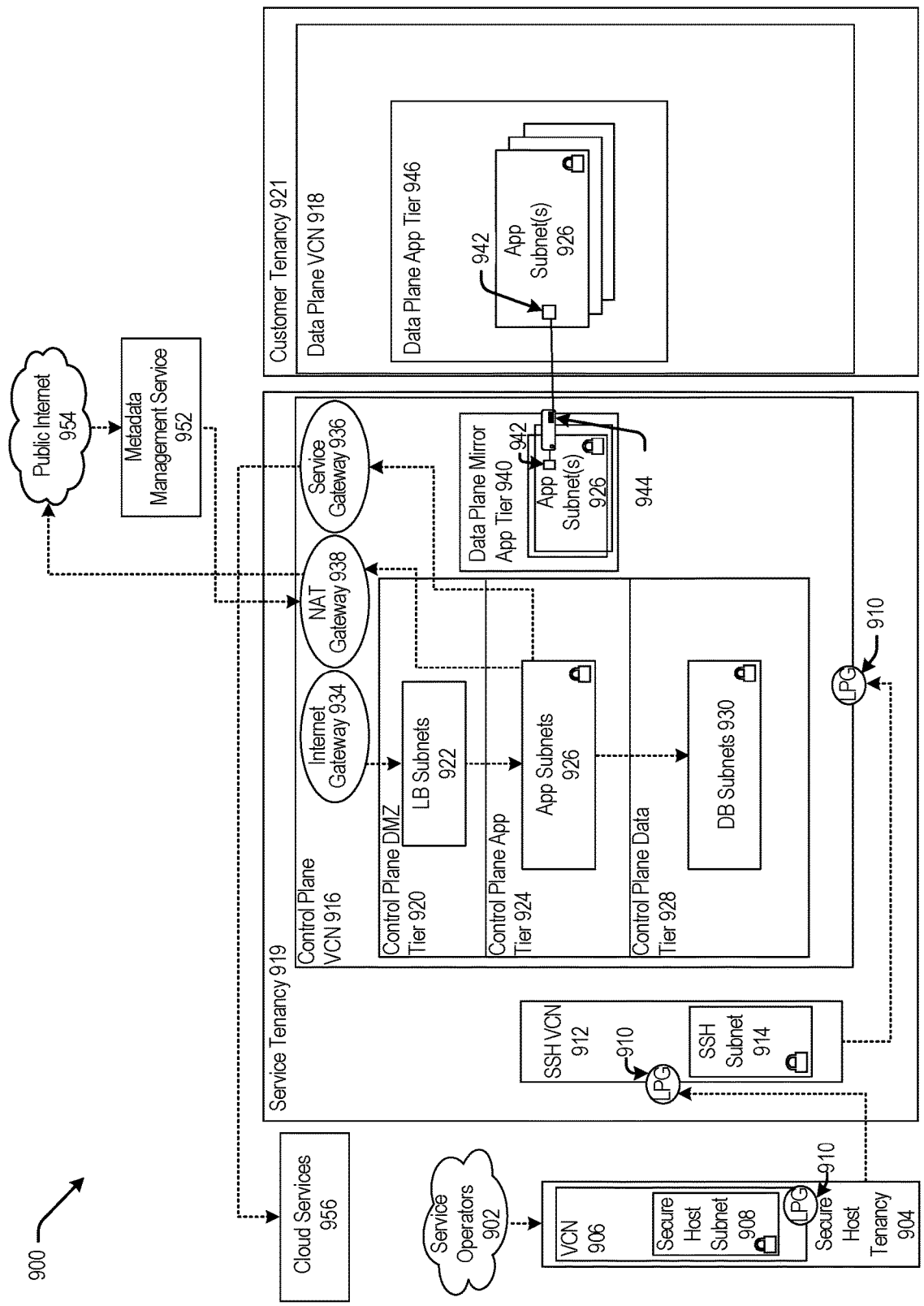
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
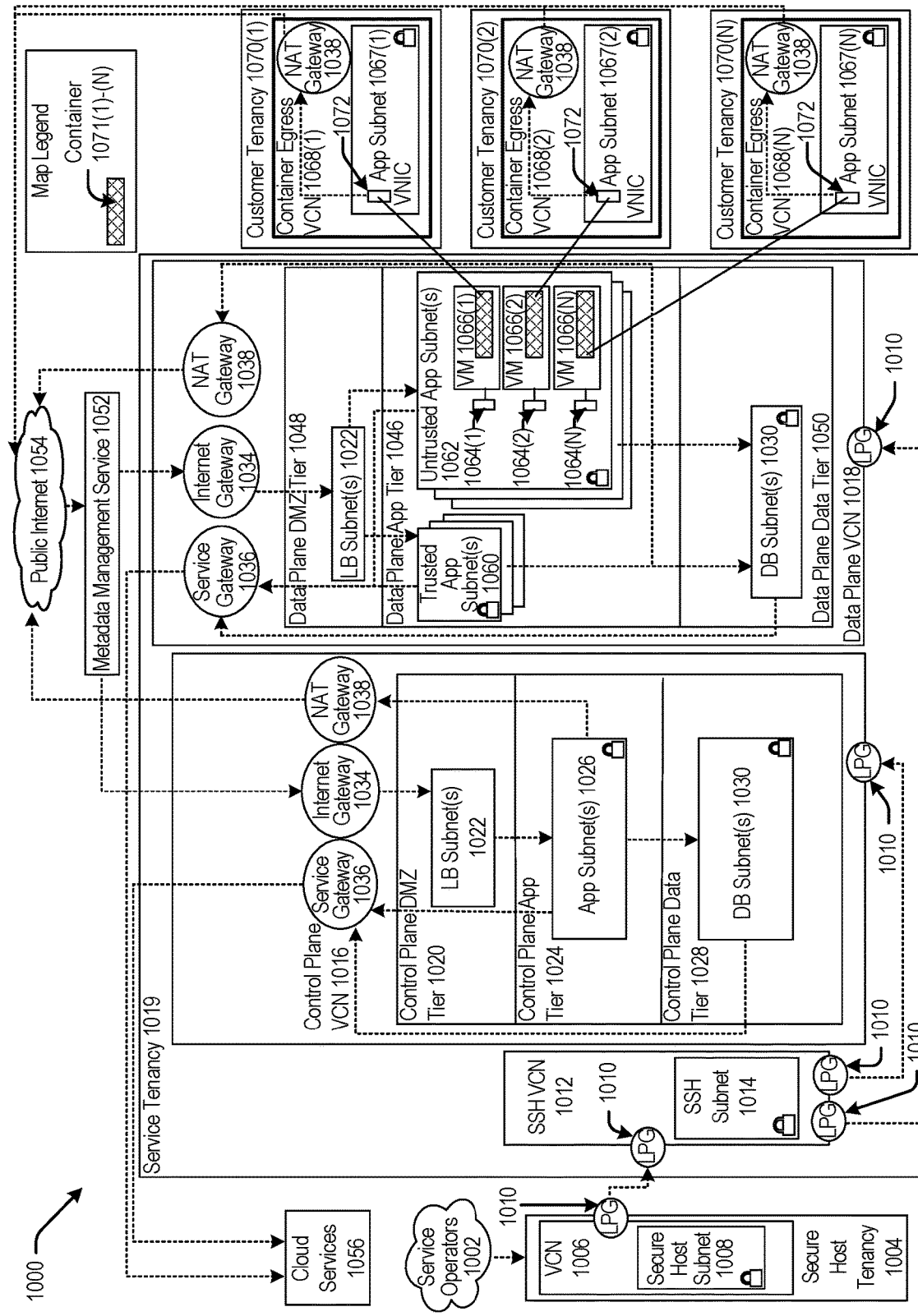
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
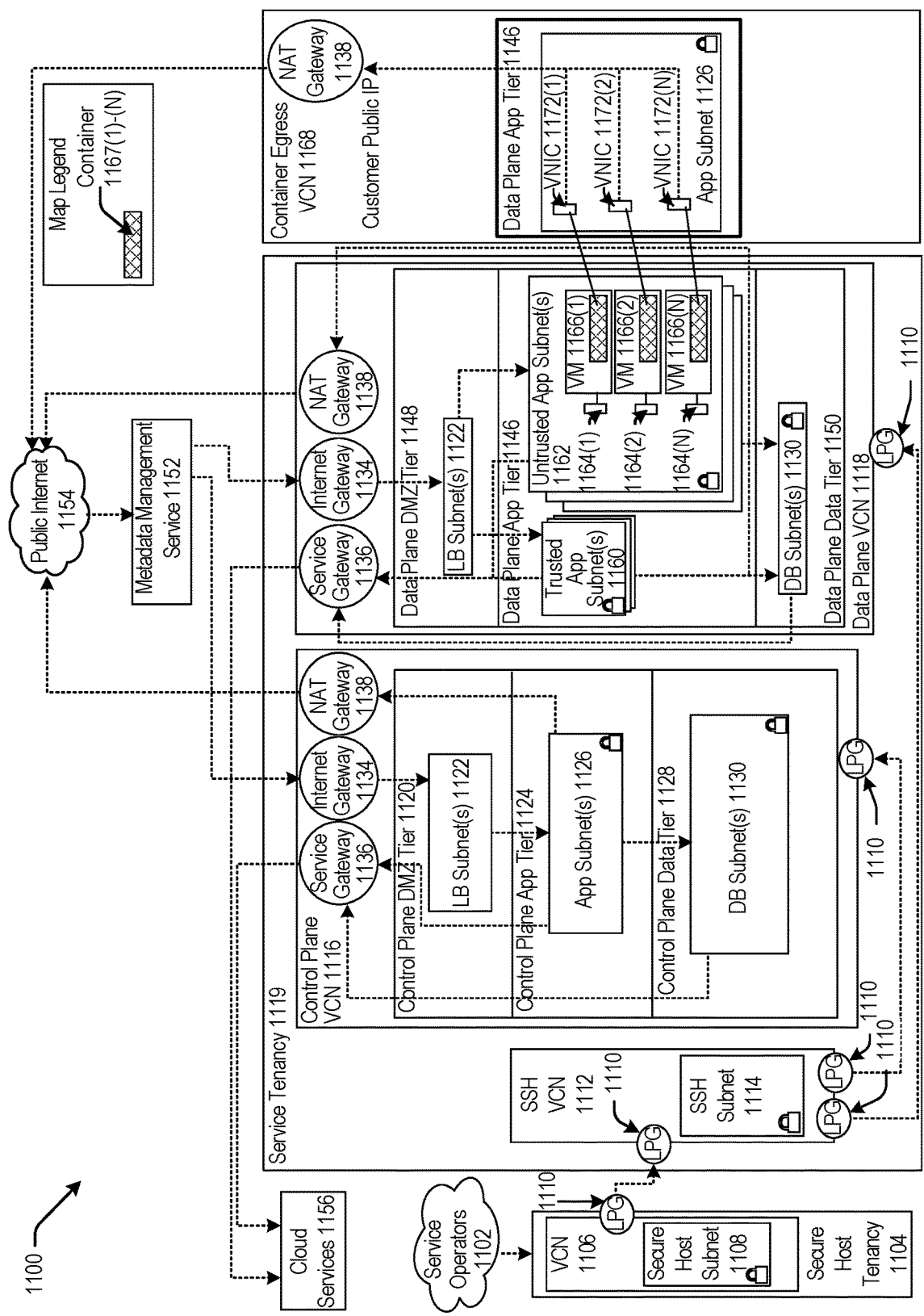
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
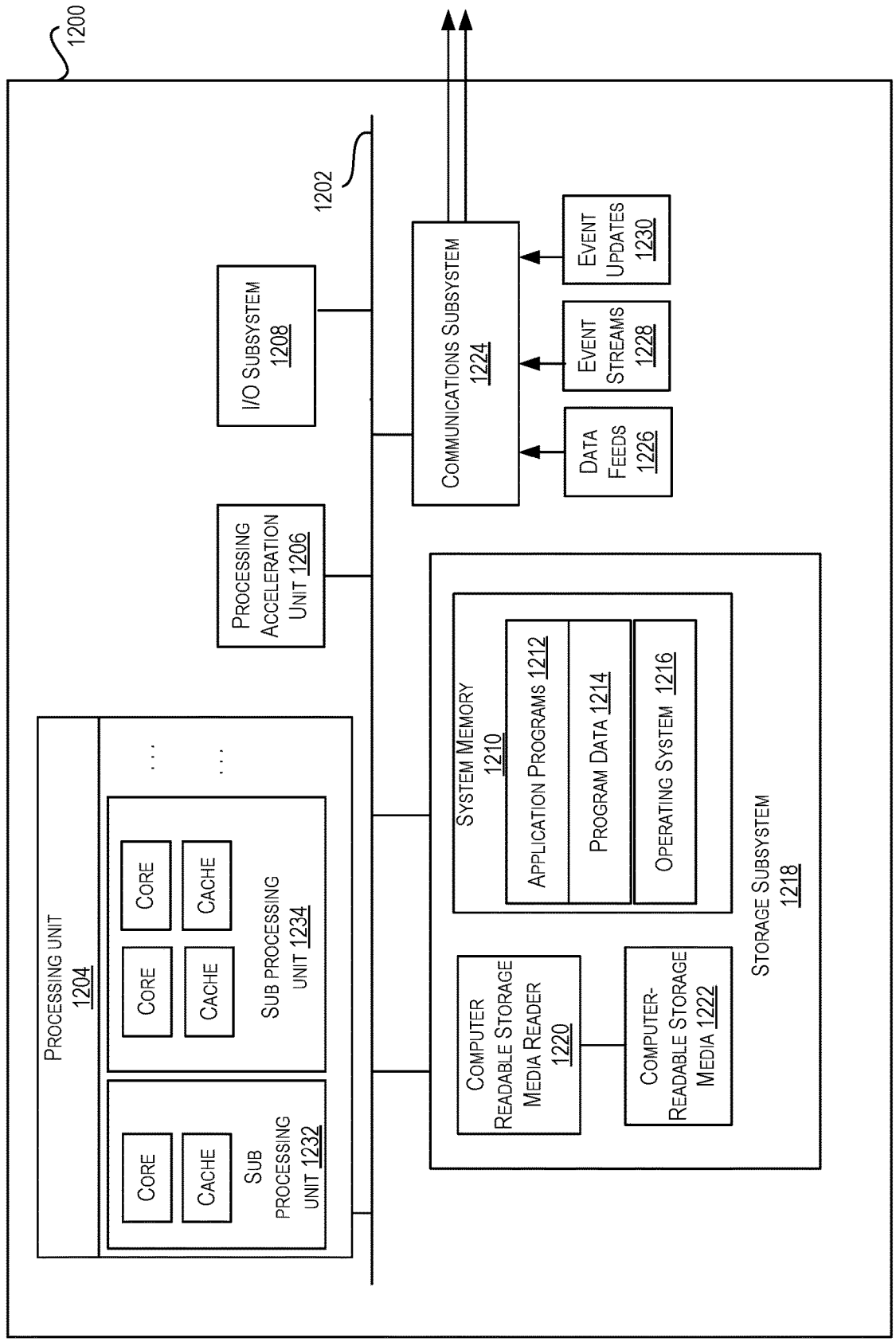
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.). The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

EXAMPLES

In the following sections, further exemplary embodiments are provided.

Example 1 may include a method for facilitating multi-region login, comprising receiving a request to log in to a network of a cloud service provider (CSP), identifying login credentials received in the request, retrieving, from two or more regions of the cloud service provider, authentication information related to the request, determining, based at least in part on the login credentials and the authentication information, whether to provide access to the network, and providing access to the network in accordance with a determination to provide access to the network, or denying access to the network in accordance with a determination not to provide access to the network.

Example 2 may include the method of example 1, wherein retrieving the authentication information includes retrieving the authentication information from a home region for an account associated with the request and a first subscribed region for the account.

Example 3 may include the method of example 2, wherein retrieving the authentication information includes retrieving first authentication information from the home region, retrieving second authentication information from the first subscribed region, and consolidating the first authentication information and the second authentication information to produce the authentication information.

Example 4 may include the method of example 3, wherein consolidating the first authentication information and the second authentication information comprises generating combined authentication information that includes the first authentication information and the second authentication information, identifying a first copy of particular authentication information in the combined authentication information, the first copy of the particular authentication information being from the first authentication information, identifying a second copy of the particular authentication information in the combined authentication information, the second copy of the particular authentication information being from the second authentication information, and removing one of the first copy or the second copy of the particular authentication information from the combined authentication information to produce the authentication information.

Example 5 may include the method of example 1, wherein the authentication information includes one or more previously used single-use passwords corresponding to an account associated with the request, wherein the login credentials include a single-use password provided in the request, and wherein determining whether to provide access to the network includes determining to provide access to the network based at least in part on the single-use password being absent from the one or more previously used single-use passwords.

Example 6 may include the method of example 1, further comprising identifying authentication data included in the login credentials, storing the authentication data in a first region of the two or more regions to be utilized for future login attempts, and storing the authentication data in a second region of the two or more regions to be utilized for the future login attempts.

Example 7 may include the method of example 6, wherein storing the authentication data in the second region includes replicating the authentication data from the first region to the second region via a synchronized back channel communication between the first region and the second region.

Example 8 may include the method of example 1, wherein the request is received at a first region of the cloud service provider separate from the two or more regions, and wherein retrieving the authentication information includes making back channel calls to the two or more regions to retrieve the authentication information.

Example 9 may include the method of example 1, wherein the two or more regions comprise a first region and a second region, wherein the method further comprises determining that the first region is unavailable, and wherein retrieving the authentication information includes bypassing a first back channel call to the first region to retrieve the authentication information based at least in part on the determination that the first region is unavailable, and making a second back channel call to the second region to retrieve the authentication information.

Example 10 may include the method of example 1, further comprising determining one or more available regions for login, presenting a user interface indicating the one or more available regions for selection of a login region from the one or more available regions, and identifying a selection of the login region from the one or more available regions, wherein the request is received at the login region based at least in part on the identification of the selection of the login region.

Example 11 may include one or more computer-readable media having instructions stored thereon, wherein the instructions, when executed by one or more processors, cause the one or more processors to perform operations comprising receiving a request to log in to a network of a cloud service provider (CSP), identifying login credentials received in the request, retrieving, from two or more regions of the cloud service provider, authentication information related to the request, determining, based at least in part on the login credentials and the authentication information, whether to provide access to the network, and providing access to the network in accordance with a determination to provide access to the network, or denying access to the network in accordance with a determination not to provide access to the network.

Example 12 may include the one or more computer-readable media of example 11, wherein retrieving the authentication information includes retrieving first authentication information from a home region for an account associated with the request, retrieving second authentication information from a first subscribed region for the account, and consolidating the first authentication information and the second authentication information to produce the authentication information.

Example 13 may include the one or more computer-readable media of example 11, wherein the authentication information includes one or more previously used single-use passwords corresponding to an account associated with the request, wherein the login credentials include a single-use password provided in the request, and wherein determining whether to provide access to the network includes determining to provide access to the network based at least in part on the single-use password being absent from the one or more previously used single-use passwords.

Example 14 may include the one or more computer-readable media of example 11, wherein the instructions, when executed by the one or more processors, further cause the one or more processors to perform operations comprising identifying authentication data included in the login credentials, providing the authentication data to a first region of the two or more regions for storage and to be utilized in future login attempts, and providing the authentication data to a second region of the two or more regions for storage and to be utilized in the future login attempts.

Example 15 may include the one or more computer-readable media of example 11, wherein retrieving the authentication information includes making back channel calls to the two or more regions to retrieve the authentication information.

Example 16 may include the one or more computer-readable media of example 11, wherein the two or more regions comprise a first region and a second region, wherein the instructions, when executed by the one or more processors, further cause the one or more processors to perform operations comprising determining that the first region is unavailable, and wherein retrieving the authentication information includes bypassing a first back channel call to the first region to retrieve the authentication information based at least in part on the determination that the first region is unavailable, and making a second back channel call to the second region to retrieve the authentication information.

Example 17 may include the one or more computer-readable media of example 11, wherein the instructions, when executed by the one or more processors, further cause the one or more processors to perform operations comprising determining one or more available regions for login, presenting a user interface indicating the one or more available regions for selection of a login region from the one or more available regions, and identifying a selection of the login region from the one or more available regions, wherein the request is received at the login region based at least in part on the identification of the selection of the login region.

Example 18 may include a server device, comprising memory to store login credentials received in a request, and one or more processors coupled to the memory, the one or more processors to receive the request to log in to a network of a cloud service provider (CSP), identify the login credentials received in the request, store the login credentials in the memory, retrieve, from two or more regions of the cloud service provider, authentication information related to the request, determine, based at least in part on the login credentials and the authentication information, whether to provide access to the network, and provide access to the network in accordance with a determination to provide access to the network, or deny access to the network in accordance with a determination not to provide access to the network.

Example 19 may include the server device of example 18, wherein to retrieve the authentication information from a home region for an account associated with the request and a first subscribed region for the account.

Example 20 may include the server device of example 18, wherein the authentication information includes one or more previously used single-use passwords corresponding to an account associated with the request, wherein the login credentials include a single-use password provided in the request, and wherein to determine whether to provide access to the network includes to determine to provide access to the network based at least in part on the single-use password being absent from the one or more previously used single-use passwords.

Example 21 may include a method, comprising receiving, by a computing device, a request to log in to a network of a cloud service provider (CSP), identifying, by the computing device, login credentials received in the request, the login credentials including a passcode, querying, by the computing device, a first data center of the cloud service provider located in a first region for first authentication information related to the request, the first authentication information including a first set of passcodes utilized for login to the network in accordance with the first region being available, querying, by the computing device, a second data center of the cloud service provider located in a second region for second authentication information related to the request, the second authentication information including a second set of passcodes utilized for login to the network or replicated from the first set of passcodes in accordance with the second region being available, determining, by the computing device based at least in part on one or more responses received in response to the querying of the first data center or the querying of the second data center, whether the passcode had been previously utilized, determining, by the computing device, whether to provide access to the network based at least in part on whether the passcode had been previously utilized, and providing, by the computing device, access to the network in accordance with a determination to provide access to the network.

Example 22 may include the method of example 21, wherein the first region comprises a home region for an account associated with the request, and wherein the second region comprises a first subscribed region associated with the account.

Example 23 may include the method of example 22, further comprising receiving, by the computing device, the one or more responses, wherein the one or more responses comprises the first set of passcodes from the first data center and the second set of passcodes from the second data center, and consolidating the first set of passcodes and the second set of passcodes to produce a consolidated set of passcodes, wherein the determining whether the passcode has been previously utilized is based at least in part on the consolidated set of passcodes.

Example 24 may include the method of example 23, wherein consolidating the first set of passcodes and the second set of passcodes comprises generating a combined set of passcodes that includes first passcodes from the first set of passcodes and second passcodes from the second set of passcodes, identifying a first copy of a particular passcode in the combined set of passcodes, the first copy of the particular passcode being from the first set of passcodes, identifying a second copy of the particular passcode in the combined set of passcodes, the second copy of the particular passcode being from the second set of passcodes, and removing one of the first copy or the second copy of the particular passcode from the combined set of passcodes to produce the consolidated set of passcodes.

Example 25 may include the method of example 21, wherein the first set of passcodes includes a first set of one or more previously utilized single-use passwords corresponding to an account associated with the request and the second set of passcodes includes a second set of one or more previously utilized single-use passwords corresponding to the account, wherein the passcode includes a single-use password provided in the request, and wherein determining whether the passcode had been previously utilized includes determining whether the single-use password is included in the first set of one or more previously utilized single-use passwords or the second set of one or more previously utilized single-use passwords.

Example 26 may include the method of example 21, further comprising identifying authentication data included in the login credentials, storing the authentication data in the first data center to be utilized for future login attempts, and storing the authentication data in the second data center to be utilized for the future login attempts.

Example 27 may include the method of example 26, wherein storing the authentication data in the second data center includes replicating the authentication data from the first data center to the second data center via a synchronized back channel communication between the first data center and the second data center.

Example 28 may include the method of example 21, wherein the request is received at a third data center of the cloud service provider located in a third region separate from the first region and the second region, wherein querying the first data center includes making a first back channel call to the first data center to retrieve the first set of passcodes, and wherein querying the second data center includes making a second back channel call to the second data center to retrieve the second set of passcodes.

Example 29 may include the method of example 21, further comprising determining that the first data center is unavailable, wherein querying the first data center comprises bypassing a first back channel call to the first data center to retrieve the first set of passcodes based at least in part on the determination that the first data center is unavailable, and querying the second data center comprises making a second back channel call to the second data center to retrieve the second set of passcodes.

Example 30 may include the method of example 21, further comprising determining one or more available regions for login, presenting a user interface indicating the one or more available regions for selection of a login region from the one or more available regions, and identifying a selection of the first region from the one or more available regions, wherein the request is received at the computing device in the first region based at least in part on the identification of the selection of the first region.

Example 31 may include one or more non-transitory computer-readable media having instructions stored thereon, wherein the instructions, when executed by one or more processors, cause the one or more processors to perform operations comprising receiving a request to log in to a network of a cloud service provider (CSP), identifying login credentials received in the request, the login credentials including a passcode, querying a first data center of the cloud service provider located in a first region for first authentication information related to the request, the first authentication information including a first set of passcodes utilized for login to the network in accordance with the first region being available, querying a second data center of the cloud service provider located in a second region for second authentication information related to the request, the second authentication information including a second set of passcodes utilized for login to the network or replicated from the first set of passcodes in accordance with the second region being available, determining, based at least in part on one or more responses received in response to the querying of the first data center or the querying of the second data center, whether the passcode had been previously utilized, determining whether to provide access to the network based at least in part on whether the passcode had been previously utilized, and providing access to the network in accordance with a determination to provide access to the network.

Example 32 may include the non-transitory one or more computer-readable media of example 31, wherein the first region comprises a home region for an account associated with the request, wherein the second region comprises a first subscribed region for the account, and wherein the instructions, when executed by the one or more processors, further cause the one or more processors to perform operations comprising consolidating the first set of passcodes and the second set of passcodes to produce a consolidated set of passcodes.

Example 33 may include the non-transitory one or more computer-readable media of example 31, wherein the first set of passcodes includes a first set of one or more previously utilized single-use passwords corresponding to an account associated with the request and the second set of passcodes includes a second set of one or more previously utilized single-use passwords corresponding to the account, wherein the passcode includes a single-use password provided in the request, and wherein determining whether the passcode had been previously utilized includes determining whether the single-use password is included in the first set of one or more previously utilized single-use passwords or the second set of one or more previously utilized single-use passwords.

Example 34 may include the non-transitory one or more computer-readable media of example 31, wherein the instructions, when executed by the one or more processors, further cause the one or more processors to perform operations comprising identifying authentication data included in the login credentials, providing the authentication data to first data center for storage and to be utilized in future login attempts, and providing the authentication data to the second data center for storage and to be utilized in the future login attempts.

Example 35 may include the non-transitory one or more computer-readable media of example 31, wherein querying the first data center includes making a first back channel call to the first data center, and wherein querying the second data center includes making a second back channel call to the second data center.

Example 36 may include the non-transitory one or more computer-readable media of example 31, wherein the instructions, when executed by the one or more processors, further cause the one or more processors to perform operations comprising determining that the first data center is unavailable, and wherein querying the first data center comprises bypassing a first back channel call to the first data center to retrieve the first set of passcodes based at least in part on the determination that the first data center is unavailable, and querying the second data center comprises making a second back channel call to the second data center to retrieve the second set of passcodes.

Example 37 may include the non-transitory one or more computer-readable media of example 31, wherein the instructions, when executed by the one or more processors, further cause the one or more processors to perform operations comprising determining one or more available regions for login, presenting a user interface indicating the one or more available regions for selection of a login region from the one or more available regions, and identifying a selection of the first region from the one or more available regions, wherein the request is received at the first region based at least in part on the identification of the selection of the first region.

Example 38 may include a server device, comprising memory to store login credentials received in a request, and one or more processors coupled to the memory, the one or more processors to receive the request to log in to a network of a cloud service provider (CSP), identify the login credentials received in the request, the login credentials including a passcode, store the login credentials in the memory, query a first data center of the cloud service provider located in a first region for first authentication information related to the request, the first authentication information including a first set of passcodes utilized for login to the network in accordance with the first region being available, query a second data center of the cloud service provider located in a second region for second authentication information related to the request, the second authentication information including a second set of passcodes utilized for login to the network or replicated from the first set of passcodes in accordance with the second region being available, determine, based at least in part on one or more responses received in response to the querying of the first data center or the querying of the second data center, whether the passcode had been previously utilized, determine whether to provide access to the network based at least in part on whether the passcode had been previously utilized, and provide access to the network in accordance with a determination to provide access to the network.

Example 39 may include the server device of example 38, wherein the first region comprises a home region for an account associated with the request, and wherein the second region comprises a first subscribed region for the account.

Example 40 may include the server device of example 38, wherein the first set of passcodes includes a first set of one or more previously utilized single-use passwords corresponding to an account associated with the request and the second set of passcodes includes a second set of one or more previously utilized single-use passwords corresponding to the account, wherein the passcode includes a single-use password provided in the request, and wherein to determine whether the passcode had been previously utilized includes determining whether the single-use password is included in the first set of one or more previously utilized single-use passwords or the second set of one or more previously utilized single-use passwords.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
receiving, by a computing device, a request to log in to a network of a cloud service provider (CSP);
identifying, by the computing device, login credentials received in the request, the login credentials including a passcode;
querying, by the computing device using the login credentials, a first data center of the cloud service provider located in a first region for first authentication information related to the request, the first authentication information including a first set of passcodes utilized for login to the network;
querying, by the computing device using the login credentials, a second data center of the cloud service provider located in a second region for second authentication information related to the request, the second authentication information including a second set of passcodes utilized for login to the network or replicated from the first set of passcodes;
determining, by the computing device based at least in part on one or more responses received in response to the querying of the first data center and/or the querying of the second data center, whether the passcode had been previously utilized;
determining, by the computing device, whether to provide access to the network based at least in part on whether the passcode had been previously utilized; and
providing, by the computing device, access to the network in accordance with a determination to provide access to the network.

2. The method of claim 1, wherein the first region comprises a home region for an account associated with the request, and wherein the second region comprises a first subscribed region associated with the account.

3. The method of claim 2, further comprising:
receiving, by the computing device, the one or more responses, wherein the one or more responses comprises the first set of passcodes from the first data center and the second set of passcodes from the second data center; and consolidating the first set of passcodes and the second set of passcodes to produce a consolidated set of passcodes, wherein the determining whether the passcode has been previously utilized is based at least in part on the consolidated set of passcodes.

4. The method of claim 3, wherein consolidating the first set of passcodes and the second set of passcodes comprises:
generating a combined set of passcodes that includes first passcodes from the first set of passcodes and second passcodes from the second set of passcodes;
identifying a first copy of a particular passcode in the combined set of passcodes, the first copy of the particular passcode being from the first set of passcodes;
identifying a second copy of the particular passcode in the combined set of passcodes, the second copy of the particular passcode being from the second set of passcodes; and
removing one of the first copy or the second copy of the particular passcode from the combined set of passcodes to produce the consolidated set of passcodes.

5. The method of claim 1, wherein the first set of passcodes includes a first set of one or more previously utilized single-use passwords corresponding to an account associated with the request and the second set of passcodes includes a second set of one or more previously utilized single-use passwords corresponding to the account, wherein the passcode includes a single-use password provided in the request, and wherein determining whether the passcode had been previously utilized includes determining whether the single-use password is included in the first set of one or more previously utilized single-use passwords or the second set of one or more previously utilized single-use passwords.

6. The method of claim 1, further comprising:
identifying authentication data included in the login credentials;
storing the authentication data in the first data center to be utilized for future login attempts; and
storing the authentication data in the second data center to be utilized for the future login attempts.

7. The method of claim 1, wherein the request is received at a third data center of the cloud service provider located in a third region separate from the first region and the second region, wherein querying the first data center includes making a first back channel call to the first data center to retrieve the first set of passcodes, and wherein querying the second data center includes making a second back channel call to the second data center to retrieve the second set of passcodes.

8. The method of claim 1, further comprising:
determining that the first data center is unavailable, wherein
querying the first data center comprises bypassing a first back channel call to the first data center to retrieve the first set of passcodes based at least in part on the determination that the first data center is unavailable; and
querying the second data center comprises making a second back channel call to the second data center to retrieve the second set of passcodes.

9. The method of claim 1, further comprising:
determining one or more available regions for login;
presenting a user interface indicating the one or more available regions for selection of a login region from the one or more available regions; and identifying a selection of the first region from the one or more available regions, wherein the request is received at the computing device in the first region based at least in part on the identification of the selection of the first region.

10. One or more non-transitory computer-readable media having instructions stored thereon, wherein the instructions, when executed by one or more processors, cause the one or more processors to perform operations comprising:
receiving a request to log in to a network of a cloud service provider (CSP);
identifying login credentials received in the request, the login credentials including a passcode;
querying, using the login credentials, a first data center of the cloud service provider located in a first region for first authentication information related to the request, the first authentication information including a first set of passcodes utilized for login to the network;
querying, using the login credentials, a second data center of the cloud service provider located in a second region for second authentication information related to the request, the second authentication information including a second set of passcodes utilized for login to the network or replicated from the first set of passcodes;
determining, based at least in part on one or more responses received in response to the querying of the first data center and/or the querying of the second data center, whether the passcode had been previously utilized;
determining whether to provide access to the network based at least in part on whether the passcode had been previously utilized; and
providing access to the network in accordance with a determination to provide access to the network.

11. The non-transitory one or more computer-readable media of claim 10, wherein the first region comprises a home region for an account associated with the request, wherein the second region comprises a first subscribed region for the account, and wherein the instructions, when executed by the one or more processors, further cause the one or more processors to perform operations comprising:
consolidating the first set of passcodes and the second set of passcodes to produce a consolidated set of passcodes.

12. The non-transitory one or more computer-readable media of claim 10, wherein the first set of passcodes includes a first set of one or more previously utilized single-use passwords corresponding to an account associated with the request and the second set of passcodes includes a second set of one or more previously utilized single-use passwords corresponding to the account, wherein the passcode includes a single-use password provided in the request, and wherein determining whether the passcode had been previously utilized includes determining whether the single-use password is included in the first set of one or more previously utilized single-use passwords or the second set of one or more previously utilized single-use passwords.

13. The non-transitory one or more computer-readable media of claim 10, wherein the instructions, when executed by the one or more processors, further cause the one or more processors to perform operations comprising:
identifying authentication data included in the login credentials;
providing the authentication data to the first data center for storage and to be utilized in future login attempts; and providing the authentication data to the second data center for storage and to be utilized in the future login attempts.

14. The non-transitory one or more computer-readable media of claim 10, wherein querying the first data center includes making a first back channel call to the first data center, and wherein querying the second data center includes making a second back channel call to the second data center.

15. The non-transitory one or more computer-readable media of claim 10, wherein the instructions, when executed by the one or more processors, further cause the one or more processors to perform operations comprising:
   determining one or more available regions for login;
   presenting a user interface indicating the one or more available regions for selection of a login region from the one or more available regions; and
   identifying a selection of the first region from the one or more available regions, wherein the request is received at the first region based at least in part on the identification of the selection of the first region.

16. A server device, comprising:
   memory to store login credentials received in a request; and
   one or more processors coupled to the memory, the one or more processors configured to:
      receive the request to log in to a network of a cloud service provider (CSP);
      identify the login credentials received in the request, the login credentials including a passcode;
      store the login credentials in the memory;
      query, using the login credentials, a first data center of the cloud service provider located in a first region for first authentication information related to the request, the first authentication information including a first set of passcodes utilized for login to the network;
      query, using the login credentials, a second data center of the cloud service provider located in a second region for second authentication information related to the request, the second authentication information including a second set of passcodes utilized for login to the network or replicated from the first set of passcodes;
      determine, based at least in part on one or more responses received in response to the querying of the first data center and/or the querying of the second data center, whether the passcode had been previously utilized;
      determine whether to provide access to the network based at least in part on whether the passcode had been previously utilized; and
      provide access to the network in accordance with a determination to provide access to the network.

17. The server device of claim 16, wherein the first region comprises a home region for an account associated with the request, and wherein the second region comprises a first subscribed region for the account.

18. The server device of claim 16, wherein the first set of passcodes includes a first set of one or more previously utilized single-use passwords corresponding to an account associated with the request and the second set of passcodes includes a second set of one or more previously utilized single-use passwords corresponding to the account, wherein the passcode includes a single-use password provided in the request, and wherein to determine whether the passcode had been previously utilized includes determining whether the single-use password is included in the first set of one or more previously utilized single-use passwords or the second set of one or more previously utilized single-use passwords.

19. The method of claim 1, further comprising:
   responsive to querying the first data center, receiving the first authentication information from the first data center, the first set of passcodes of the first authentication information including a first set of single-use passwords; and
   responsive to querying the second data center, receiving the second authentication information from the second data center, the second set of passcodes of the second authentication information including a second set of single-use passwords, wherein the one or more responses received in response to the querying of the first data center and/or the querying of the second data center include the first authentication information received from the first data center and the second authentication information received from the second data center.

20. The method of claim 1, wherein the passcode includes a single-use password, and wherein determining whether the passcode had been previously utilized includes determining whether the single-use password had been previously utilized based at least in part on comparing the single-use password with one or more single-use passwords received in the one or more responses.

\* \* \* \* \*